(12) United States Patent
Suzuki

(10) Patent No.: US 6,795,384 B2
(45) Date of Patent: Sep. 21, 2004

(54) METHOD AND APPARATUS FOR RECORDING DATA AT ACCURATE LOCATION ON RECORDING MEDIUM

(75) Inventor: Haruyuki Suzuki, Kanagawa (JP)

(73) Assignee: Ricoh Company, Ltd. (JP)

( * ) Notice: Subject to any disclaimer, the term of this patent is extended or adjusted under 35 U.S.C. 154(b) by 507 days.

(21) Appl. No.: 09/861,631

(22) Filed: May 22, 2001

(65) Prior Publication Data

US 2002/0012297 A1 Jan. 31, 2002

(30) Foreign Application Priority Data

May 24, 2000 (JP) ........................................ 2000-153117

(51) Int. Cl.$^7$ ............................................... G11B 7/00
(52) U.S. Cl. ................. 369/47.33; 369/47.3; 369/53.37
(58) Field of Search ........................... 369/47.33, 47.31, 369/53.37, 47.3, 47.28, 47.25

(56) References Cited

U.S. PATENT DOCUMENTS 6,445,656 B1 * 9/2002 Koide ...................... 369/47.28

FOREIGN PATENT DOCUMENTS

| CN | 1 252 601 A | 5/2000 |
|---|---|---|
| EP | 0 805 438 A | 11/1997 |
| EP | 0 825 602 A | 2/1998 |
| EP | 0 871 173 A | 10/1998 |
| EP | 0 974 966 A | 1/2000 |
| JP | 03 228266 A | 10/1991 |
| JP | 05 182356 A | 7/1993 |
| JP | 2000-40302 | 2/2000 |

* cited by examiner

Primary Examiner—Naril Hindi
(74) Attorney, Agent, or Firm—Dickstein Shapiro Morin & Oshinsky LLP

(57) ABSTRACT

An information recording device includes a buffer memory, a buffer management unit and a phase adjusting unit. The buffer memory temporarily stores data to be written in a recording medium. The buffer management unit starts writing the data in the recording medium if a size of the data stored in the buffer memory exceeds a first predetermined size, and suspends writing the data in the recording medium if the size of the data stored in the buffer memory becomes less than a second predetermined size. Additionally, the phase adjusting unit starts adjusting a phase error between a signal synchronous to the data and a signal synchronous to a location on the recording medium when the buffer management unit starts writing the data in the recording medium, and finishes adjusting the phase error so that the phase error becomes substantially zero before the buffer management unit suspends writing the data in the recording medium.

24 Claims, 18 Drawing Sheets

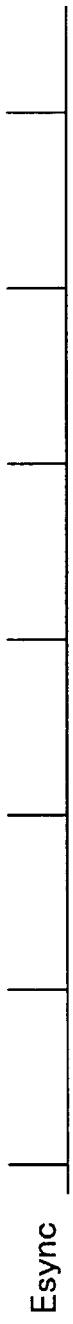
FIG.3A Esync
FIG.3B Async
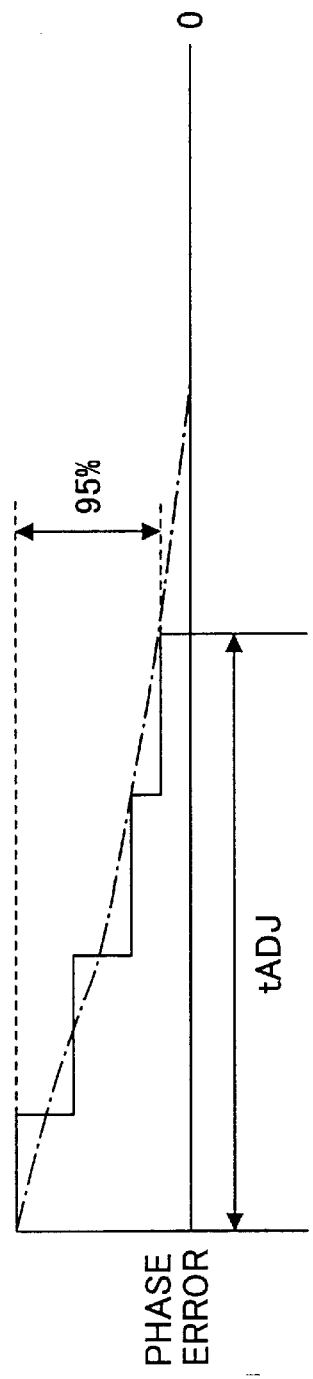
FIG.3C PHASE ERROR

METHOD AND APPARATUS FOR RECORDING DATA AT ACCURATE LOCATION ON RECORDING MEDIUM

BACKGROUND OF THE INVENTION

1. Field of the Invention

The present invention relates to an information recording device, an information recording method, a recording medium storing an information recording program, an information recording system, an optical-disk recording device, an optical-disk recording method and an optical-disk recording system.

2. Description of the Related Art

An optical-disk recording device that writes data continuously in an optical disk such as a CD-R (CD-Recordable) temporarily stores the data in a buffer prior to the writing thereof to the optical disk. If a data input speed to the buffer is slower than a data write speed to the optical disk for a certain period, the buffer runs out of the data stored therein, and the optical-disk recording device becomes unable to continue writing the data in the optical disk. Such an error is called a buffer under-run error.

An optical-disk recording device disclosed in Japanese Laid-open Patent Application No. 2000-40302 suspends recording data in an optical disk if it decides that the buffer under-run error will occur. On the other hand, if the optical-disk recording device decides that the buffer under-run error has been avoided, it resumes recording the data in the optical disk by starting from a location where the last data item was recorded or where the optical-disk recording device has suspended recording the data.

This optical-disk recording device disclosed in Japanese Laid-open Patent Application No. 2000-40302 can suspend recording data in the optical disk before the buffer under-run error occurs. In addition, this optical-disk recording device can prevent a data recording failure caused by the buffer under-run error, by resuming writing the data in the optical disk only after the data is stored in the buffer for a sufficient amount. Such a method of preventing the data recording failure is called a buffer under-run error preventing function.

The above-described optical-disk recording device carries out phase control to match an expected location of data to be written in the optical disk with an absolute location on the optical disk when the optical-disk recording device starts writing the data in the optical disk. In detail, the optical-disk recording device compares a phase of a synchronous signal "Async" (ATIP Synchronous) with a phase of a synchronous signal "Esync" (Encoder Subcode Synchronous). The synchronous signal "Async" is periodically added to absolute-location information (ATIP) that indicates the absolute location on the optical disk. The synchronous signal "Esync" is periodically added to the data to be written in the optical disk. The optical-disk recording device, then, controls a spinning speed of the optical disk to eliminate a phase error between the signal "Async" and the signal "Esync".

A resolution of detecting the signal "Async" is comparatively low according to such a phase control, and, thus, some phase error is unavoidable. For example, an instantaneous phase error occurs in the CD-R generally in a range of −2 frames to 2 frames, but is not accumulated. In this case, one frame corresponds to 588 channel bits, and has approximately a 180 $\mu$m length. Two frames are approximately 360 $\mu$m long.

If the data input speed to the buffer is extremely slow, the above-described optical-disk recording device suspends writing data in the optical disk shortly after starting writing the data in the optical disk, by using the buffer under-run error preventing function. Consequently, the phase error possibly occurs at a suspended location for about −2 to 2 frames with respect to the absolute location on the optical disk.

Additionally, if the optical-disk recording device resumes recording the data in the optical disk from the suspended location, it starts writing the data from a location right after the suspended location to connect the data in sequence. Thus, the phase control possibly starts in a condition in which an initial phase to write the data is shifted by about two frames. Accordingly, if the initial phase is shifted as described above, the optical-disk recording device corrects conditions such as the spinning speed of the optical disk by carrying out the phase control, to eliminate an average phase error of about −2 to 2 frames.

However, if a data recording process is suspended by the buffer under-run error preventing function again while the correction of the conditions is being made by the phase control, the optical-disk recording device normally halts with a remaining phase error. In other words, the instantaneous phase error at the suspended location is shifted about −2 to 2 frames from the average phase error. Thus, the instantaneous phase error may increase by the size of the average phase error.

Accordingly, by repeating the suspension and the resumption of the data recording process, the average phase error is accumulated gradually, and the optical-disk recording device may become unable to correct the phase error at last.

For instance, a sector of a CD is composed of 98 frames. When the phase error becomes larger than one sector, the optical-disk recording device becomes unable to correct the phase error. Consequently, a writing or recording error occurs, or the CD becomes unplayable.

SUMMARY OF THE INVENTION

Accordingly, it is a general object of the present invention to provide an information recording device, an information recording method, a recording medium storing an information recording program, an information recording system, an optical-disk recording device, an optical-disk recording method and an optical-disk recording system.

A more particular object of the present invention is to provide an information recording device, an information recording method, a recording medium storing an information recording program, an information recording system, an optical-disk recording device, an optical-disk recording method and an optical-disk recording system, which achieve a data writing process always at a correct location without accumulating a phase error even if suspension of the data writing process by a buffer under-run error preventing function and resumption of the data writing process are repeated.

The above-described object of the present invention is achieved by an information recording device that writes data in a recording medium, including a data storing unit storing the data temporarily; a data writing unit that takes the data out from the data storing unit sequentially, and writes the data in the recording medium; a writing control unit that controls the data writing unit to start writing the data in the recording medium if a size of the data stored in the data storing unit exceeds a first predetermined size, and to suspend writing the data in the recording medium if the size of the data stored in the data storing unit becomes less than a second predetermined size; and a phase adjusting unit that starts adjusting a phase error between a signal synchronous to the data and a signal synchronous to a location on the recording medium when the data writing unit starts writing the data in the recording medium, and finishes adjusting the phase error so that the phase error becomes substantially zero before the writing control unit suspends the data writing unit from writing the data in the recording medium.

The above-described object of the present invention is also achieved by a method of recording data in a recording medium, including the steps of storing the data temporarily as a stored data; taking out the stored data sequentially; starting writing the stored data in the recording medium when a size of the stored data exceeds a first predetermined size; suspending writing the stored data in the recording medium when the size of the stored data becomes less than a second predetermined size; starting adjusting a phase error between a signal synchronous to the stored data and a signal synchronous to a location on the recording medium when starting writing the stored data in the recording medium; and finishing adjusting the phase error so that the phase error becomes substantially zero before suspending writing the stored data in the recording medium.

The above-described object of the present invention is also achieved by a recording medium readable by a computer, tangibly embodying a program of instructions executable by the computer to write data in a recording medium, wherein the program includes the steps of storing the data temporarily as a stored data; taking out the stored data sequentially; starting writing the stored data in the recording medium when a size of the stored data exceeds a first predetermined size; suspending writing the stored data in the recording medium when the size of the stored data becomes less than a second predetermined size; starting adjusting a phase error between a signal synchronous to the stored data and a signal synchronous to a location on the recording medium when starting writing the stored data in the recording medium; and finishing adjusting the phase error so that the phase error becomes substantially zero before suspending writing the stored data in the recording medium.

The above-described object of the present invention is also achieved by an information recording system, including an upper-level device outputting data to be written in a recording medium; and an information recording device writing the data outputted from the upper-level device in the recording medium, wherein the information recording device includes a data storing unit storing the data temporarily; a data writing unit that takes the data out from the data storing unit sequentially, and writes the data in the recording medium; a writing control unit that controls the data writing unit to start writing the data in the recording medium if a size of the data stored in the data storing unit exceeds a first predetermined size, and to suspend writing the data in the recording medium if the size of the data stored in the data storing unit becomes less than a second predetermined size; and a phase adjusting unit that starts adjusting a phase error between a signal synchronous to the data and a signal synchronous to a location on the recording medium when the data writing unit starts writing the data in the recording medium, and finishes adjusting the phase error so that the phase error becomes substantially zero before the writing control unit suspends the data writing unit from writing the data in the recording medium.

The optical-disk recording device, the optical-disk recording method and the optical-disk recording system are provided by using an optical disk as the recording medium, and writing the data or the stored data in the optical disk by applying light onto the optical disk, in the above-described information recording device, method of recording data in the recording medium, and information recording system, respectively.

Other objects, features and advantages of the present invention will become more apparent from the following detailed description when read in conjunction with the accompanying drawings.

BRIEF DESCRIPTION OF THE DRAWINGS

FIGS. 3A, 3B and 3C are diagrams showing a phase adjusting process carried out by a phase adjusting unit shown in FIG. 1;

DESCRIPTION OF THE PREFERRED EMBODIMENTS

A description will now be given of preferred embodiments of the present invention, with reference to the accompanying drawings.

Figure 1:
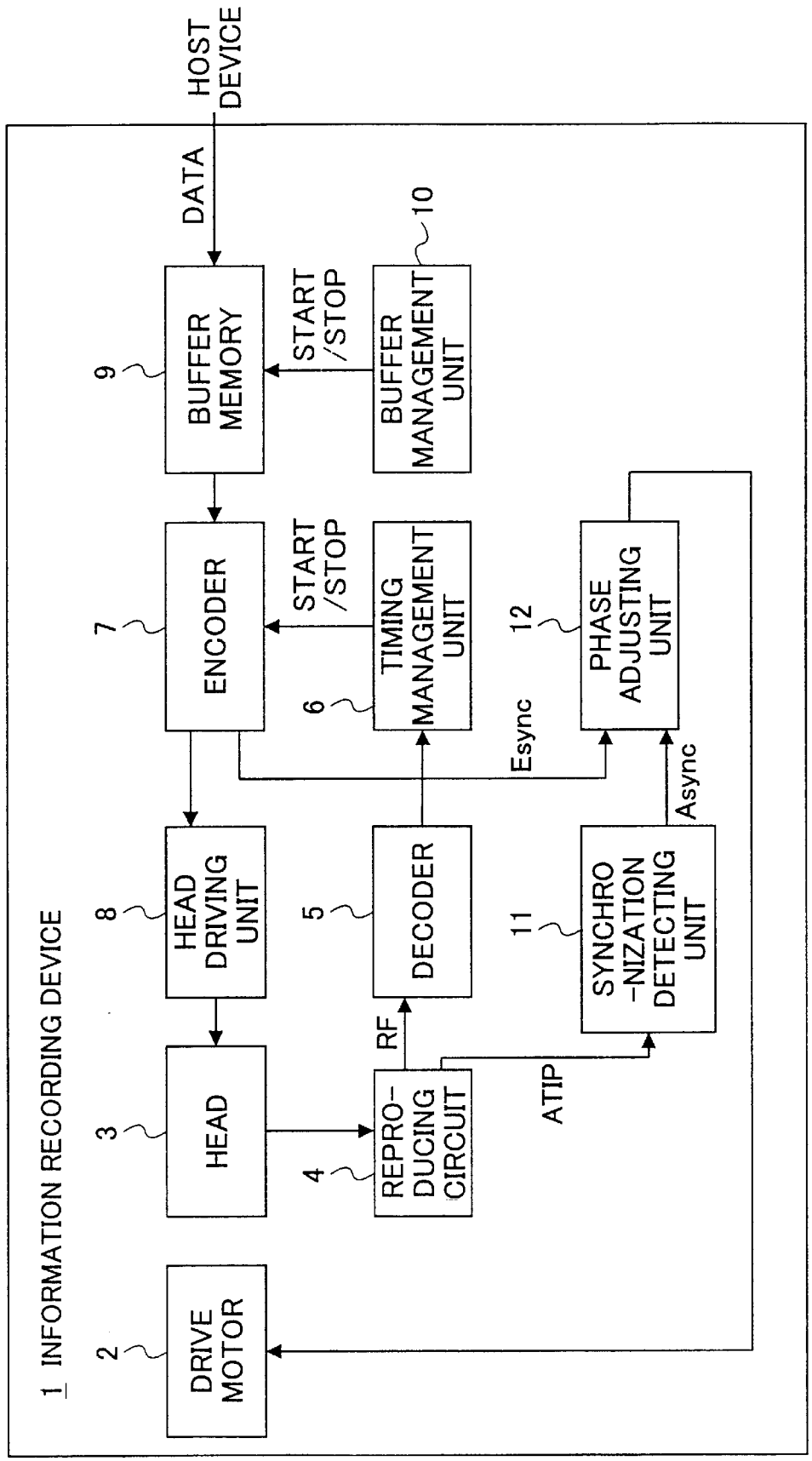
FIG. 1 is a block diagram showing a structure of an information recording device according to a first embodiment of the present invention.

FIG. 1 is a block diagram showing a structure of an information recording device 1 according to a first embodiment of the present invention. The information recording device 1 shown in FIG. 1 includes a drive motor 2, a head 3, a reproducing circuit 4, a decoder 5, a timing management unit 6, an encoder 7, a head driving unit 8, a buffer memory 9, a buffer management unit 10, a synchronization detecting unit 11 and a phase adjusting unit 12.

The drive motor 2 drives a recording medium not shown in the figures. The head 3 writes data in the recording medium or reads data from the recording medium by accessing to the recording medium. The reproducing circuit 4 processes a reproduced signal supplied from the head 3, and outputs a RF signal and an ATIP signal. The RF signal is a data reproduction signal read out from the recording medium. The ATIP signal is an absolute-location information signal that indicates an absolute location on the recording medium, and corresponds to a location synchronous signal.

The decoder 5 demodulates the RF signal supplied from the reproducing circuit 4. The timing management unit 6 reproduces data from a location preceding a previously suspended location if a data recording (writing) process is to be resumed, and starts the encoder 7 by matching an encoding timing to the end of the data recorded in the recording medium. The encoder 7 extracts data (recording data) to be recorded in the recording medium, from the buffer memory 9, and carries out an encoding process, an interleaving process, or a modulation process appropriately on the recording data. Subsequently, the encoder 7 creates a recording data series, and supplies the recording data series to the head driving unit 8.

The head driving unit 8 controls modulation driving performed by the head 3 for the data recording process, based on the recording data series received from the encoder 7. The buffer memory 9 receives the recording data from a host device not shown in the figures, and temporarily stores the recording data therein. The recording data temporarily stored in the buffer memory 9 is supplied to the encoder 7, based on an instruction from the buffer management unit 10, and is written in the recording medium by the head 3, which is controlled by the head driving unit 8.

Figure 2:
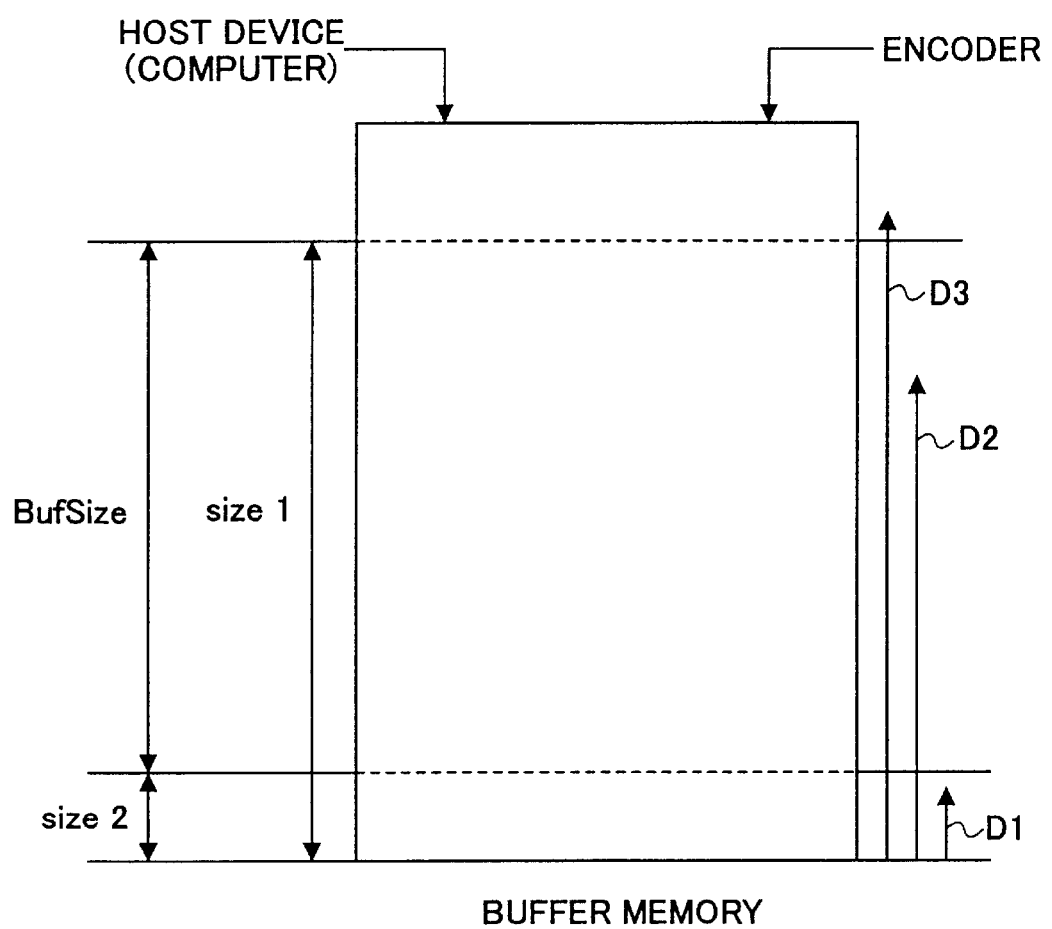
FIG. 2 is a diagram showing a buffer managing process carried out a buffer management unit shown in FIG. 1.

A description will now be given of a buffer managing process of the buffer memory 9 carried out by the buffer management unit 10, with reference to FIG. 2.

The buffer memory 9 temporarily stores data supplied from the host device, and, then, supplies the data to the encoder 7. Meanwhile, a size of data remained in the buffer memory 9 changes by a difference between a size of the data supplied from the host device and a size of the data supplied from the buffer memory 9 to the encoder 7. If the size of the data supplied from the host device continues being smaller than the size of the data supplied from the buffer memory 9 to the encoder 7, the size of the data remained in the buffer memory 9 keeps decreasing, and the buffer memory 9 becomes empty at the end. Consequently, data supply to the encoder 7 is cut, and the data recording process is suspended. Such an error is called a buffer under-run error.

In order to prevent the buffer under-run error, the buffer management unit 10 suspends the data recording process to the recording medium, by suspending data supply from the buffer memory 9 to the encoder 7 if the size of the data remained in the buffer memory 9 becomes smaller than or equal to a second predetermined value (size) "size2". Additionally, the buffer management unit 10 does not resume the data recording process immediately after the size of the data remained in the buffer memory 9 exceeds the second predetermined value "size2" as a result of the data supply from the host device. Instead, the buffer management unit 10 resumes the data recording process when the size of the data remained in the buffer memory 9 becomes larger than or equal to a first predetermined value (size) "size1". The first predetermined value "size1" is set greater than the second predetermined value "size2".

For example, the first predetermined value "size1" and the second predetermined value "size2" may be set to an upper limit of a buffer capacity in the buffer memory 9 and "0", respectively. Instead, the first predetermined value "size1" and the second predetermined value "size2" are preferably set to a value less than the upper limit by a small amount and a value larger than "0" by a small amount, so as to prevent data overflow and the buffer under-run error from occurring in the buffer memory 9 during a processing period for suspending or resuming the data recording process.

As described above, the buffer management unit 10 suspends or resumes the data recording process based on the size of the data remained in the buffer memory 9. Consequently, the information recording device 1 can continuously write data whose size corresponds to a value obtained by subtracting the second predetermined value "size2" from the first predetermined value "size1", in the recording medium, from the beginning or the resumption of the data recording process to the next suspension of the data recording process, even if the size of the data supplied from the host device to the buffer memory 9 is "0". The value obtained by subtracting the second predetermined value "size2" from the first predetermined value "size1" is an effective buffer size or an effective storage size (BufSize). Thus, the effective buffer size "BufSize" is expressed as a function of the first predetermined value "size1" and the second predetermined value "size2" as follows.

$$BufSize = size1 - size2 \qquad (1)$$

In FIG. 1, the synchronization detecting unit 11 detects a synchronous signal of the signal ATIP. The phase adjusting unit 12 compares a phase of a signal "Async" supplied from the synchronization detecting unit 11 with a phase of a signal "Esync" supplied from the encoder 7, and controls a scanning speed of the drive motor 2 so that a phase difference (a phase error) becomes "0" when the data recording process to the recording medium starts. The Async signal is an absolute-location synchronous signal or a location synchronous signal that is synchronous to an absolute location on the recording medium. The Esync signal is a recording-data synchronous signal that is synchronous to the recording data series outputted from the encoder 7. In other words, the phase adjusting unit 12 controls the scanning speed of the drive motor 2 to match the absolute location of the recording data on the recording medium.

A description will now be given of a phase adjusting process carried out by the phase adjusting unit 12 shown in FIG. 1, with reference to FIGS. 3A, 3B and 3C. A "START" position shown in FIG. 3A is a timing to start writing data in the recording medium. If the Async signal shown in FIG. 3B is late compared to the Esync signal shown in FIG. 3A at the START position, a positive phase error occurs. In such a case, the phase adjusting unit 12 controls the drive motor 2 to accelerate in accordance with the positive phase error, thereby accelerating a driving speed of the recording medium. Consequently, the phase of the Async signal synchronous to a location on the recording medium gradually catches up the phase of the Esync signal. The phase adjusting unit 12 continues accelerating the drive motor 2 until the phase error between the Esync signal and the Async signal becomes "0". FIG. 3C shows an average phase error.

Additionally, a response time of phase adjusting control carried out by the phase adjusting unit 12 is defined as a period from a time at which a unit phase error occurs to a time at which the unit phase error is lessen to 5% thereof, and is called as a 95% adjusting period (tADJ). The period tADJ shown in FIG. 3C corresponds to the shortest suspension period taken for suspending the data recording process.

If it is assumed that an output value of a system approaches a unit input value "A" of the system as time passes, the output value can be expressed as the following equation by approximating such a system by use of a first-order lag system. It should be noted that signs "t" and "T" indicate a time and a time constant, respectively.

$$\text{Output} = A \times (1 - \exp(-t/T)) \qquad (2)$$

For instance, the output value becomes A×0.95 at a time t=3T. The time 3T is the 95% adjusting period (tADJ). Additionally, the phase error adjusted by the phase adjusting control is expressed as below.

$$\text{Phase Error} = A \times \exp(-t/T) \qquad (3)$$

A period taken for reducing the phase error at the beginning of the phase adjusting control to 5% of the error is 3T, based on approximation using the equation (3). In the information recording device 1 according to the present invention, the 95% adjusting period (tADJ), the effective buffer size (BufSize) and a data write speed (Wspeed) are set to have a relation as shown in an equation (4). It should be noted that units of the tADJ, the BufSize and the Wspeed are respectively a second, a byte and a byte/second.

$$tADJ < \text{BufSize}/\text{Wspeed} \qquad (4)$$

As shown in the equation (4), if the size of the data supplied from the host device to the buffer memory 9 is "0", a period in which the data recording process continues is "BufSize/Wspeed" expressed in seconds. In other words, if the size of the data supplied from the host device to the buffer memory 9 is "0", a time at which data whose size is indicated by the effective buffer size "BufSize" is removed from the buffer memory 9 is the "BufSize/Wspeed". In detail, the phase adjusting unit 12 controls the scanning speed of the drive motor 2 to complete 95% of the phase adjustment of the Async signal and the Esync signal in the period "BufSize/Wspeed", which is the shortest suspension period.

As described above, the information recording device 1 according to the present invention does not accumulate a location error of the recording data on the recording medium, even in the worst case in which the data supply speed from the host device to the buffer memory 9 is extremely slow, and the suspension and the resumption of the data recording process are repeated in the shortest period. Additionally, the phase adjusting unit 12 corrects 95% of the phase error, and, thus, the phase error is not corrected completely. However, the correction of 95% of the phase error satisfies an industrial standard.

In the above-described information recording device 1, the buffer memory 9 functions as a data storing unit that temporarily stores data therein. Additionally, the head 3, the encoder 7 and the head driving unit 8 function as a data writing unit that extracts the data from the data storing unit in order, and writes the data in a recording medium. The timing management unit 6 and the buffer management unit 10 function as a writing control unit that starts a data recording (writing) process by use of the data writing unit if a size of the data stored in the data storing unit exceeds a first predetermined value (size), and suspends the data recording process using the data writing unit if the size of the data stored in the data storing unit becomes less than a second predetermined value (size).

The phase adjusting unit 12 of the information recording device 1 functions as a phase adjusting unit that starts adjusting a phase error between a signal synchronous to data that is to be recorded in the recording medium, and a signal synchronous to a location on the recording medium when the data recording process starts, and finishes adjusting the phase error so that the phase error becomes substantially zero before suspension of the data writing process. Additionally, the phase adjusting unit 12 functions as an adjusting control unit that controls the phase adjusting unit to finish the phase adjustment so that the phase error becomes substantially zero in the shortest suspension period, which is obtained from an effective storage size of the data storing unit determined by the first and second predetermined sizes, and a data write speed to the recording medium. Further, the phase adjusting unit 12 functions as a scanning-speed adjusting unit that reduces the phase error by adjusting the scanning speed of the recording medium.

A description will now be given of an information recording process carried out by the information recording device 1 shown in FIG. 1. The information recording process includes the steps of storing data temporarily in the buffer memory 9, taking out the data from the buffer memory 9 sequentially, and writing the data in a recording medium.

Figure 4:
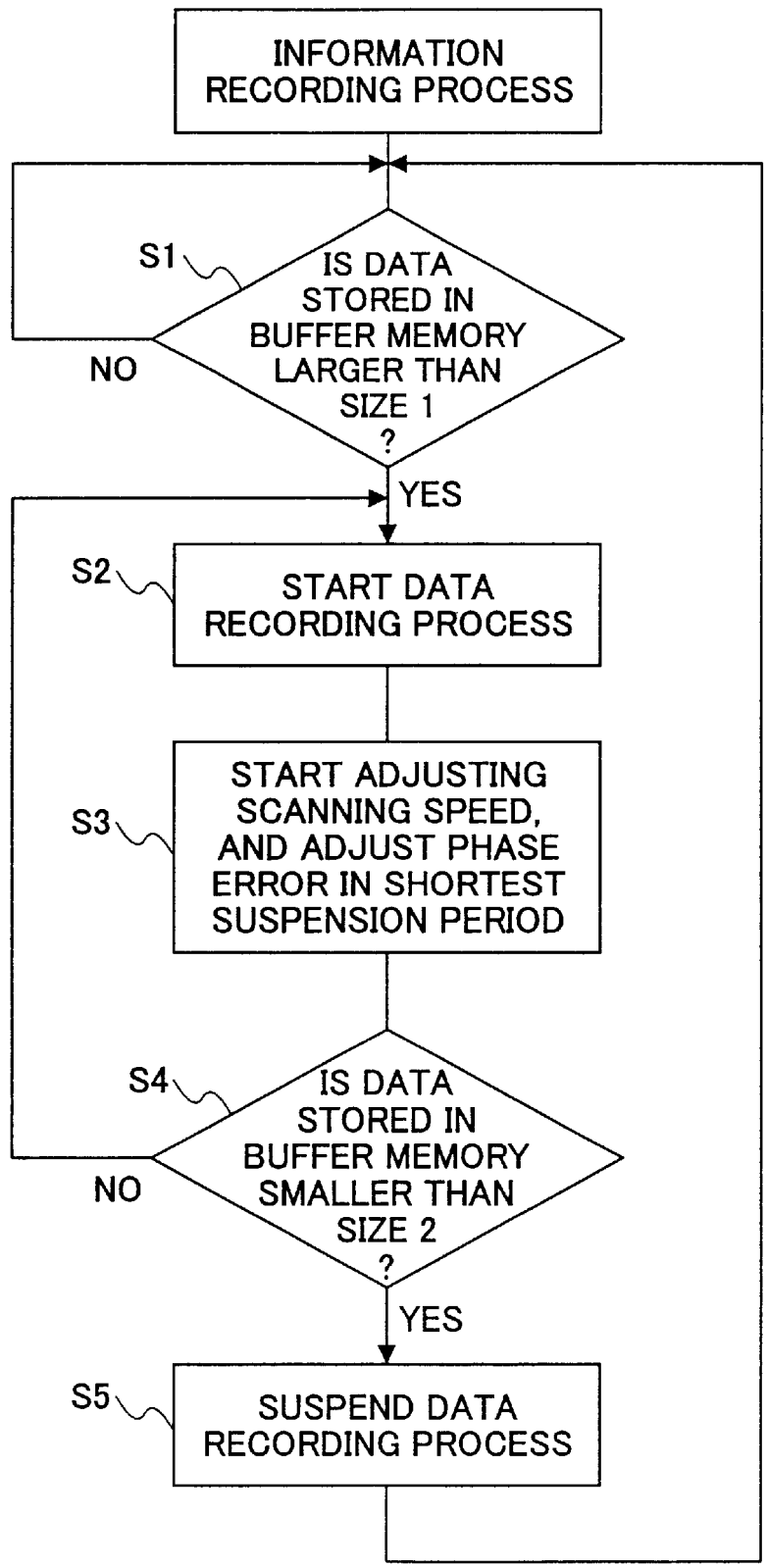
FIG. 4 is a flowchart showing an information recording process carried out by the information recording device shown in FIG. 1.

At a step S1 shown in FIG. 4, the buffer management unit 10 decides whether the size of the data stored in the buffer memory 9 exceeds the first predetermined size "size1". If it is determined at the step S1 that the size of the data stored in the buffer memory 9 exceeds the first predetermined size "size1", the buffer management unit 10 proceeds to a step S2, and starts writing the data in the recording medium. Subsequently, at a step S3, the phase adjusting unit 12 starts adjusting the scanning speed of the recording medium by use of the drive motor 2 in order to reduce the phase error between the Esync signal synchronous to the data to be written in the recording medium and the Async signal synchronous to a location on the recording medium. The phase adjusting unit 12 finishes adjusting the phase error so that the phase error becomes substantially zero in the shortest suspension period before the suspension of the data recording process.

Subsequently, at a step S4, the buffer management unit 10 decides whether the size of the data stored in the buffer memory 9 becomes less than the second predetermined size "size2". If it is determined at the step S4 that the size of the data stored in the buffer memory 9 becomes less than the second predetermined size "size2", the buffer management unit 10 suspends the data recording process.

According to the first embodiment of the present invention as described above, the information recording device 1 does not accumulate a location error of recording data on a recording medium, even in a case in which a data supply speed from a host device is extremely slow, and suspension and resumption of a data recording process are repeated in the shortest period. Therefore, the information recording device 1 according to the first embodiment achieves a stable data recording process without a recording error. Additionally, the information recording device 1 can carry out the data recording process to the recording medium at a constant speed easily and steadily. Therefore, the information recording device 1 only needs to stabilize a physical characteristic at the time of recording the data to the recording medium, and can have a simple structure.

By always satisfying the equation (4) "tADJ<BufSize/Wspeed" in the above-described information recording device 1 according to the first embodiment, the information recording device 1 possibly carries out a unstable control of the data recording process by picking up an ATIP signal detection noise or a resonance from the drive motor 2, since the response time during a regular data recording process is excessively fast. Accordingly, the response time is preferably set slower after a certain period passes since the beginning of the data recording process, or after the phase adjustment by the phase adjusting unit 12 ends.

A description will now be given of a second embodiment of the present invention.

The structure of an information recording device according to a second embodiment of the present invention is the same as the structure of the information recording device 1 according to the first embodiment. However, the information recording device according to the second embodiment has a function of the phase adjusting unit 12 different from that of the information recording device 1.

Figure 5:
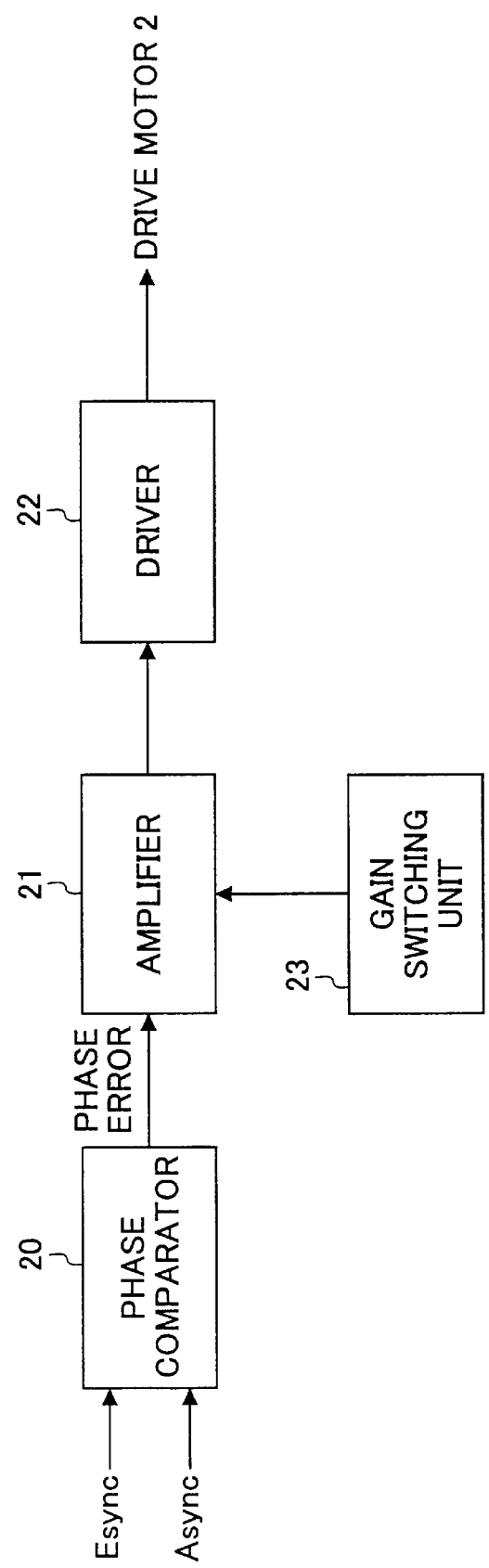
FIG. 5 is a block diagram showing an internal structure of a phase adjusting unit included in an information recording device according to a second embodiment of the present invention.

FIG. 5 is a block diagram showing an internal structure of the phase adjusting unit 12 included in the information recording device according to the second embodiment. The phase adjusting unit 12 shown in FIG. 5 includes a phase comparator 20, an amplifier 21, a driver 22 and a gain switching unit 23. The phase adjusting unit 12 detects the phase error between the Esync signal and the Async signal by use of the phase comparator 20. The amplifier 21 amplifies the phase error supplied from the phase comparator 20. Subsequently, the phase adjusting unit 12 drives the drive motor 2 by use of an output of the amplifier 21 through the driver 22.

The gain switching unit 23 switches the gain of the amplifier 21, thereby increasing or decreasing sensitivity of the phase adjustment. The increase in the gain corresponds to the shortening of the response time of the phase adjustment control. In other words, the phase adjusting unit 12 whose structure is shown in FIG. 5 functions as an adjustment-sensitivity control unit that lowers the sensitivity of the phase adjustment after the above-described phase adjustment of the Async signal and the Esync signal.

Figure 6:
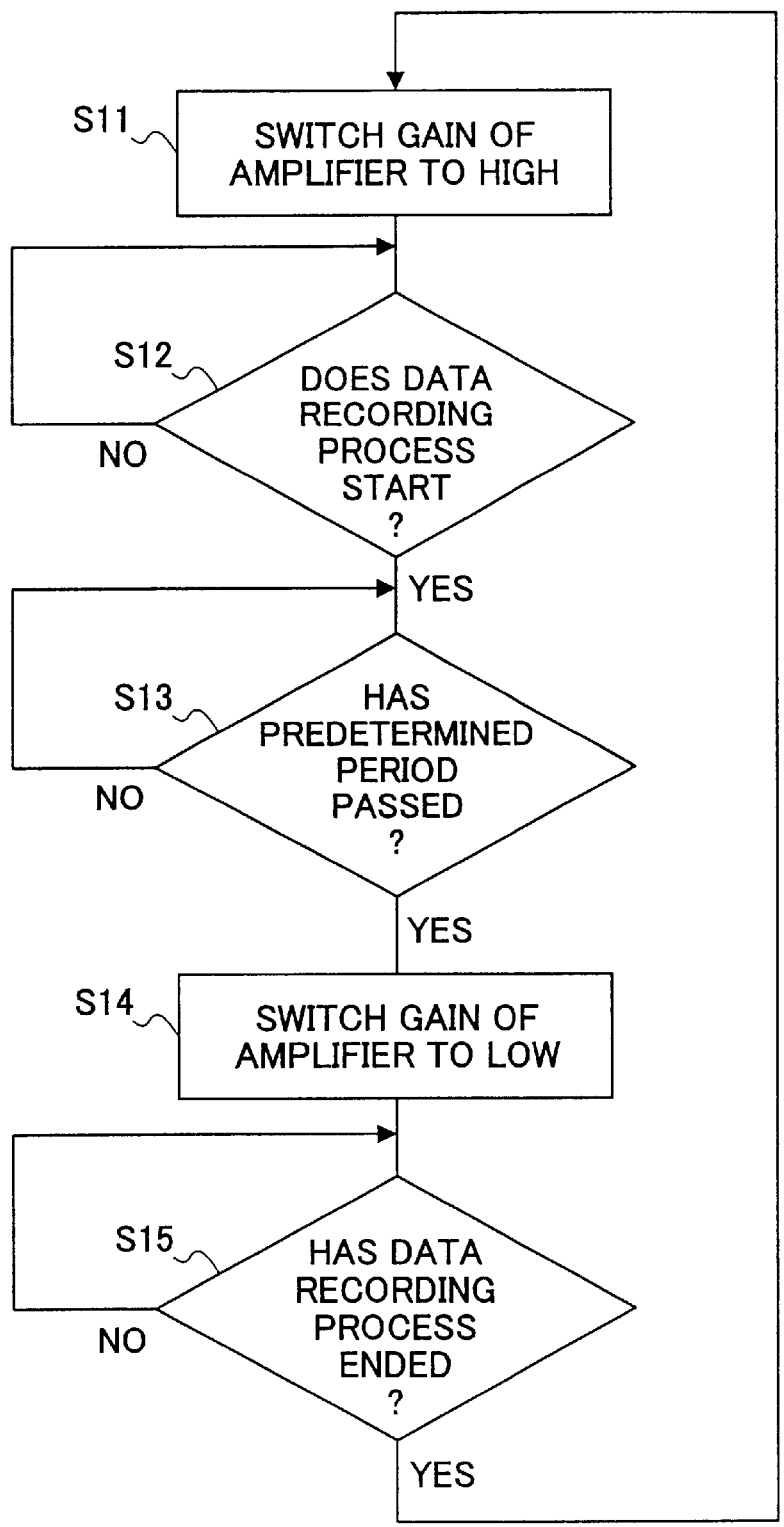
FIG. 6 is a flowchart showing a process carried out by a gain switching unit shown in FIG. 5.

A description will now be given of a phase adjusting process carried out by the phase adjusting unit 12 according to the second embodiment, with reference to FIG. 6. FIG. 6 is a flowchart showing a process carried out by the gain switching unit 23 shown in FIG. 5. At a step S11 shown in FIG. 6, the gain switching unit 23 switches the gain of the amplifier 21 to a high gain that satisfies the condition "tADJ<BufSize/Wspeed" before starting the data recording process. Subsequently, at a step S12, the gain switching unit 23 decides whether the data recording process starts. If it is determined at the step S12 that the data recording process starts, the gain switching unit 23 proceeds to a step S13. The gain switching unit 23 decides whether a predetermined period, that is, the shortest suspension period has passed, at the step S13. In detail, the gain switching unit 23 keeps the gain of the amplifier 21 high until the predetermined period passes. If it is determined at the step S13 that predetermined period has passed, the gain switching unit proceeds to a step S14, and switches the gain of the amplifier 21 from high to low, thereby lowering the sensitivity of the phase adjustment. The gain switching unit 23, then, keeps the gain of the amplifier 21 low until it is determined at a step S15 that the data recording process ends.

The information recording device according to the second embodiment lowers the sensitivity of the phase adjustment so that the above-described 95% adjusting period becomes larger than the tADJ, after data is written continuously in the recording medium since the beginning of the data recording process, and the phase adjustment is finished. Accordingly, for writing long and continuous data in the recording medium, the response time is set slow. Thus, the information recording device can carry out the stable data recording process, since the control of the information recording device is not affected by the ATIP signal detection noise or the resonance of the drive motor 2, which are picked up by the information recording device when the response time is fast.

Figure 7:
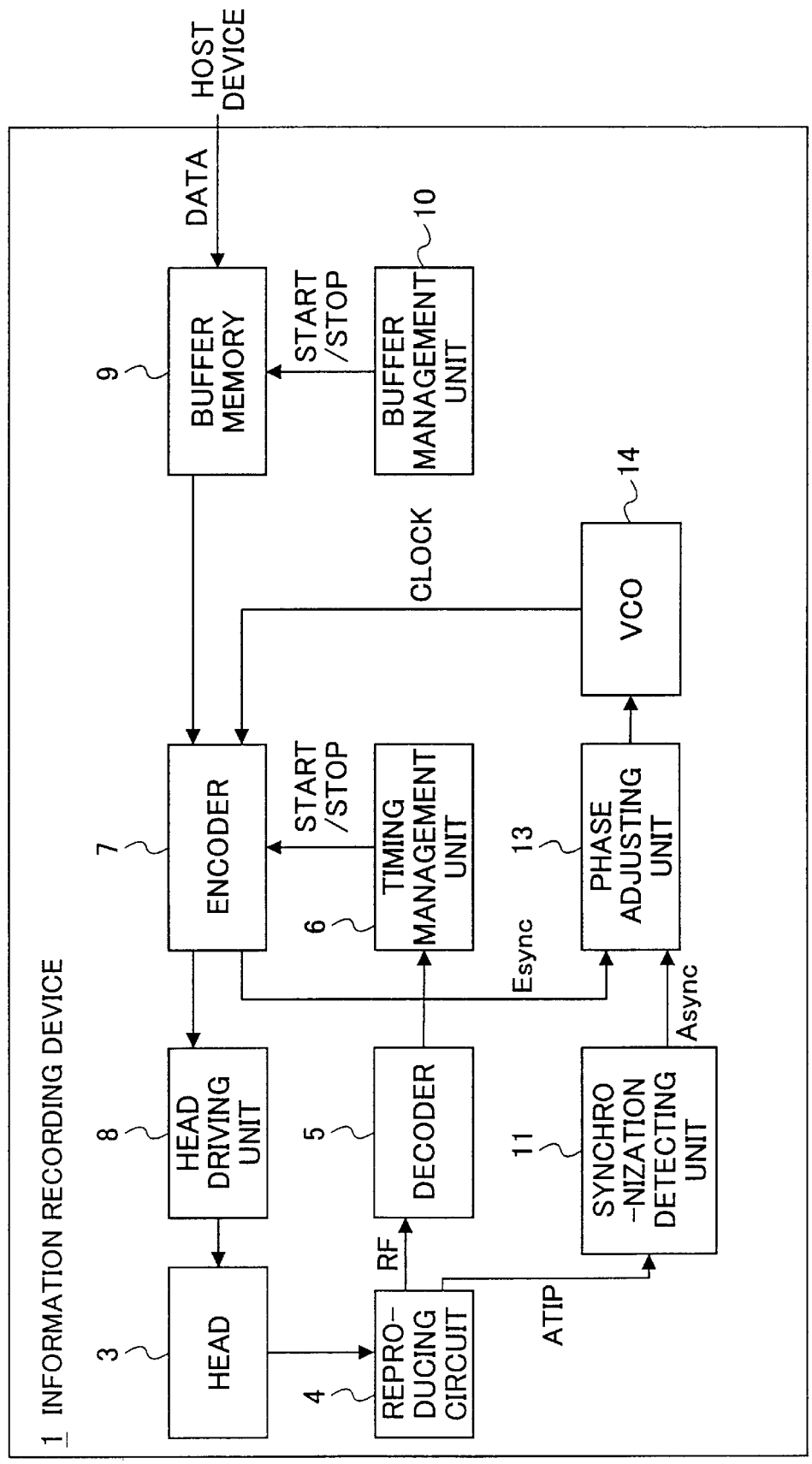
FIG. 7 is a block diagram showing a structure of an information recording device according to a third embodiment of the present invention.

A description will now be given of an information recording device according to a third embodiment of the present invention. FIG. 7 is a block diagram showing a structure of the information recording device according to the third embodiment. The information recording device shown in FIG. 7 includes the head 3, the reproducing circuit 4, the decoder 5, the timing management unit 6, the encoder 7, the head driving unit 8, the buffer memory 9, the buffer management unit 10, the synchronization detecting unit 11, a phase adjusting unit 13 and a variable frequency oscillator (VCO) 14. A unit having the same unit number as a unit shown in FIG. 1 corresponds to the unit shown in FIG. 1, and, thus, the description is omitted.

Filtering is preferably performed to avoid an error caused by a noise and the like, since the VCO 14 responds faster than the drive motor 2. Thus, the information recording device according to the third embodiment controls a clock frequency of the encoder 7 by use of the phase adjusting unit 13 and the newly provided VCO 14, whereas the information recording device according to the first and second embodiments controls the drive motor 2 by use of the phase adjusting unit 12.

Figure 9A:
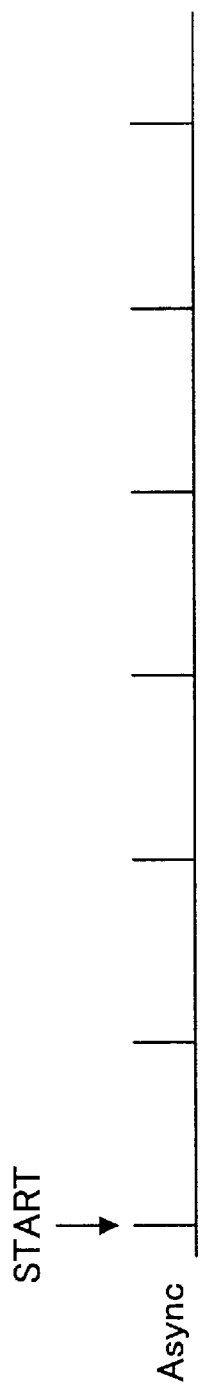
FIGS. 9A, 9B and 9C are diagrams showing a phase adjusting process carried out by the phase adjusting unit shown in FIG. 7.
Figure 9B:
Figure 9C:
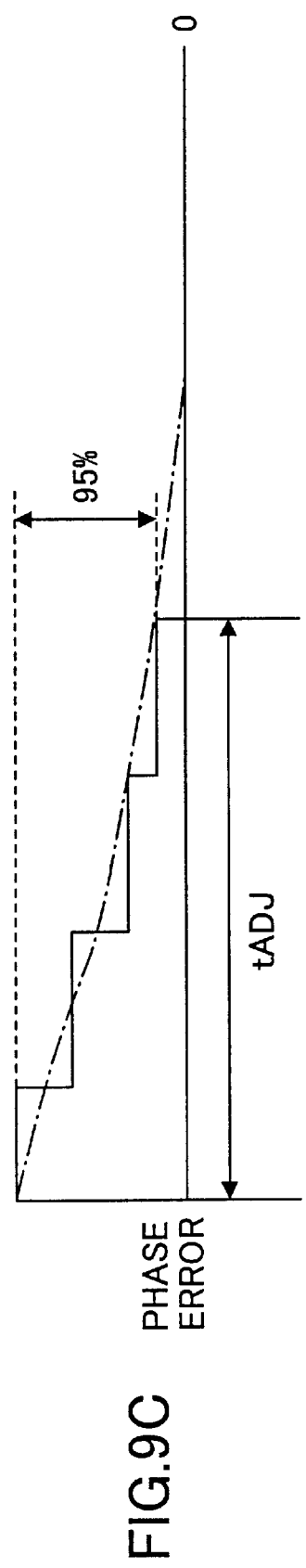

The phase adjusting unit 13 initially detects the phase error between the synchronous Esync signal outputted from the encoder 7 and the Async signal outputted from the synchronization detecting unit 11, which is the signal synchronous to the absolute location on the recording medium. The phase adjusting unit 13, then, changes frequency of an output clock of the VCO 14 to eliminate the phase error. Subsequently, the encoder 7 creates the recording data based on the output clock of the VCO 14. For instance, if the Esync signal is behind the Async signal as shown in FIGS. 9A and 9B, the frequency of the Esync signal becomes high by setting the frequency of the output clock of the VCO 14 to a high frequency. The phase of the Esync signal gradually becomes closer to the phase of the Async signal. At last, the phase error between the Async signal and the Esync signal becomes small enough so that the phases of the Async signal and the Esync signal correspond to each other.

Figure 8:
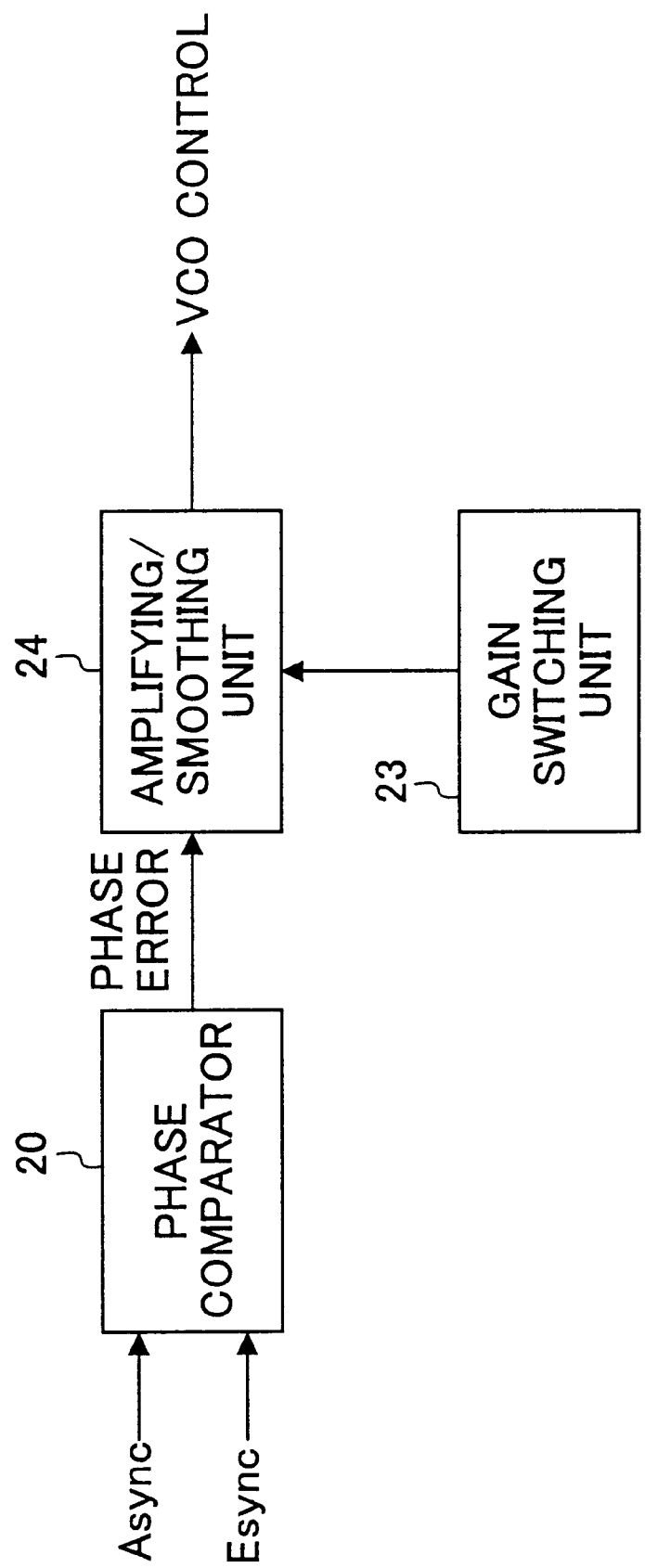
FIG. 8 is a block diagram showing a structure of a phase adjusting unit shown in FIG. 7.

As shown in FIG. 8, the above-described phase adjusting unit 13 of the information recording device according to the third embodiment includes the phase comparator 20 and the gain switching unit 23 shown in FIG. 5. Additionally, the phase adjusting unit 13 includes an amplifying/smoothing unit 24, which has a smoothing function in addition to an amplifying function.

The 95% adjusting period (tADJ) is defined as the response time of the phase adjustment also in the third embodiment. Additionally, the phase adjusting unit 13 sets the amplifying/smoothing unit 24 in the same manner as the phase adjusting unit 12 shown in FIG. 5 so that the phase adjusting unit 13 satisfies the condition "tADJ<BufSize/Wspeed". In other words, the phase adjusting unit 13 and the VCO 14 function as a clock-frequency adjusting unit that reduces the phase error by adjusting the frequency of the clock used for writing data in the recording medium. In addition, the gain switching unit 23 preferably switches gain of the amplifying/smoothing unit 24, thereby increasing or decreasing the sensitivity of the phase adjustment. The increasing gain corresponds to the shortening of the response time.

The phase adjusting unit 13 included in the information recording device according to the third embodiment carries out the phase adjusting process shown in FIG. 6. At the step S11 shown in FIG. 6, the gain switching unit 23 switches the gain of the amplifying/smoothing unit 24 to the high gain that satisfies the condition "tADJ<BufSize/Wspeed" before starting the data recording process. Subsequently, at the step S12, the gain switching unit 23 decides whether the data recording process starts. If it is determined at the step S12 that the data recording process starts, the gain switching unit 23 proceeds to the step S13. The gain switching unit 23 decides whether the predetermined period, that is, the shortest suspension period has passed, at the step S13. In detail, the gain switching unit 23 keeps the gain of the amplifier 21 high until the predetermined period passes. If it is determined at the step S13 that predetermined period has passed, the gain switching unit proceeds to the step S14, and switches the gain of the amplifier 21 from high to low, thereby lowering the sensitivity of the phase adjustment. The gain switching unit 23, then, keeps the gain of the amplifier 21 low until it is determined at the step S15 that the data recording process ends.

A description will now be given of an information recording process carried out by the information recording device according to the third embodiment, with reference to a flowchart shown in FIG. 10.

Figure 10:
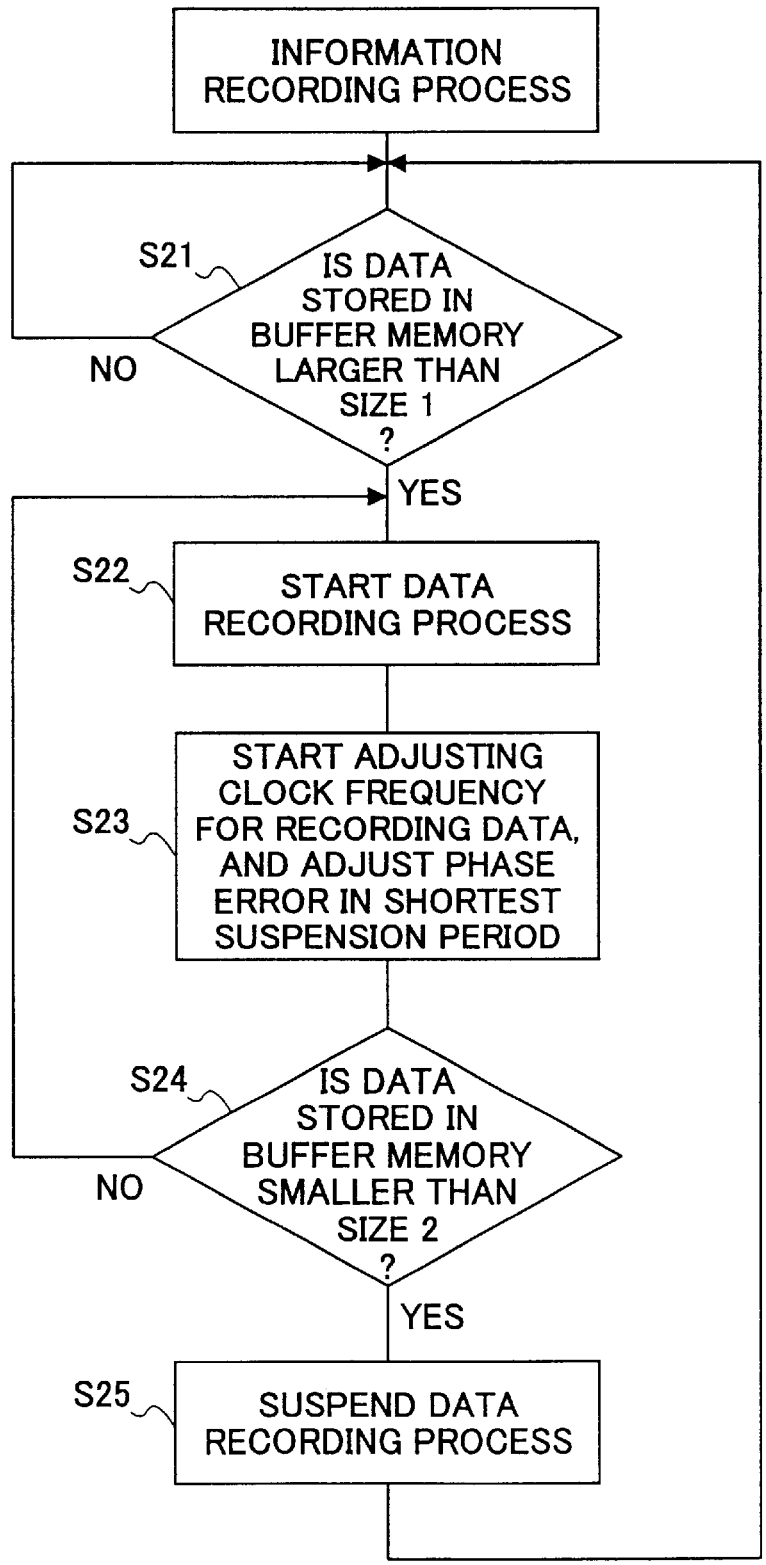
FIG. 10 is a flowchart showing an information recording process carried out by the information recording device shown in FIG. 7.

At a step S21 shown in FIG. 10, the buffer management unit 10 decides whether the size of data stored in the buffer memory 9 becomes larger than the first predetermined value (size) "size1" during the information (data) recording process. If it is determined at the step S21 that the size of the data stored in the buffer memory 9 is larger than the first predetermined size "size1", the buffer management unit 10 starts writing the data in the recording medium, at a step S22. Subsequently, at a step S23, the phase adjusting unit 13 and the VCO 14 start adjusting the frequency of the clock supplied to the encoder 7 so that the phase error between the Async signal and the Esync signal decreases. The phase adjusting unit 13 and the VCO 14 fix the phase error in the shortest suspension period before the suspension of the data recording process.

At a step S24, the buffer management unit 10 decides whether the size of the data stored in the buffer memory 9 is less than the second predetermined value (size) "size2". If it is determined at the step S24 that the size of the data stored in the buffer memory 9 is less than the second predetermined size "size2", the buffer management unit 10 stops the data recording process, at a step S25.

According to the third embodiment, the information recording device adjusts the frequency of the clock that is supplied to the encoder 7 and is used for recording the data so that the phase error decreases. Thus, the information recording device can easily and stably carry out the data recording process at a constant driving speed. Additionally, the information recording device does not need to control the driving speed of the drive motor 2 since the driving speed is constant. Thus, the information recording device according to the third embodiment can reduce its cost, and can speed up a data-write access to the recording medium.

A description will now be given of a fourth embodiment of the present invention. The above-described information recording process can be performed by the following steps. An information recording program executing the information recording process is stored in a recording medium such as a floppy disk, an optical disk or the like, and is installed in an information recording device such as a general personal computer through the recording medium. The information recording program is, then, operated by a control unit of the information recording device, which is, a functional unit composed of a micro computer including a CPU, a ROM, a RAM and the like.

In other words, the recording medium not shown in the figures such as the floppy disk or the optical disk corresponds to a recording medium readable by a computer. The recording medium readable by the computer stores an information recording program that enables the computer to have a data storing function to store data temporarily, and a data writing function to sequentially extract the data stored by the data storing function, and to write the data in the recording medium.

The information recording program also enables the computer to have a writing control function to start the data recording process by use of the data writing function if the size of the data stored by the data storing function exceeds the first predetermined size, and to suspend the data recording process that uses the data writing function if the size of the data stored by the data storing function becomes less than the second predetermined size. Additionally, the information recording program enables the computer to have a phase adjusting function to start adjusting the phase error between the signal (Esync) synchronous to data that is to be recorded in the recording medium, and the signal (Async) synchronous to the location on the recording medium, when the writing control function starts the data recording process, and to finish adjusting the phase error so that the phase error becomes substantially zero before the suspension of the data recording process.

Additionally, the information recording program enables the computer to have an adjusting control function to control the phase adjusting function to finish the phase adjustment so that the phase error becomes substantially zero in the shortest suspension period, which is obtained from the effective storage size determined by the first and second predetermined sizes, and the data write speed to the recording medium. The information recording program enables the computer to have a scanning-speed adjusting function to reduce the phase error by adjusting the scanning speed of the recording medium, and an adjustment-sensitivity control function to lower the sensitivity of the phase adjustment after the phase adjustment.

The information recording device, that is, the computer to which the above-described information recording program is installed, carries out the following processes. In a case in which the information recording device stores data temporarily, and writes the stored data in the recording medium sequentially, the information recording device starts the data recording process by use of the writing control function, when the size of the stored data becomes larger than the first predetermined size. Additionally, the information recording device suspends the data recording process when the size of the stored data becomes smaller than the second predetermined size, by use of the writing control function.

The information recording device also starts adjusting the phase error between the signal (Esync) synchronous to the data to be written in the recording medium and the signal (Async) synchronous to the location on the recording medium, by use of the phase adjusting function, when the information recording device starts the data recording process. Subsequently, the information recording device reduces the phase error in the shortest suspension period by adjusting the scanning speed of the recording medium. The information recording device, then, lowers the sensitivity of the phase adjustment after finishing the phase adjustment.

Alternatively, the above-described information recording program may enable the computer to have a clock-frequency adjusting function to reduce the phase error by adjusting the frequency of the clock used for writing data in the recording medium, instead of the scanning-speed adjusting function to reduce the phase error by adjusting the scanning speed of the recording medium. In such a case, the information recording device reduces the phase error in the shortest suspension period by adjusting the frequency of the clock used for writing the data in the recording medium.

The above-described information recording process can be easily introduced to a general computer by using the recording medium that is readable by a computer and stores the information recording program, according to the fourth embodiment of the present invention.

Figure 11:
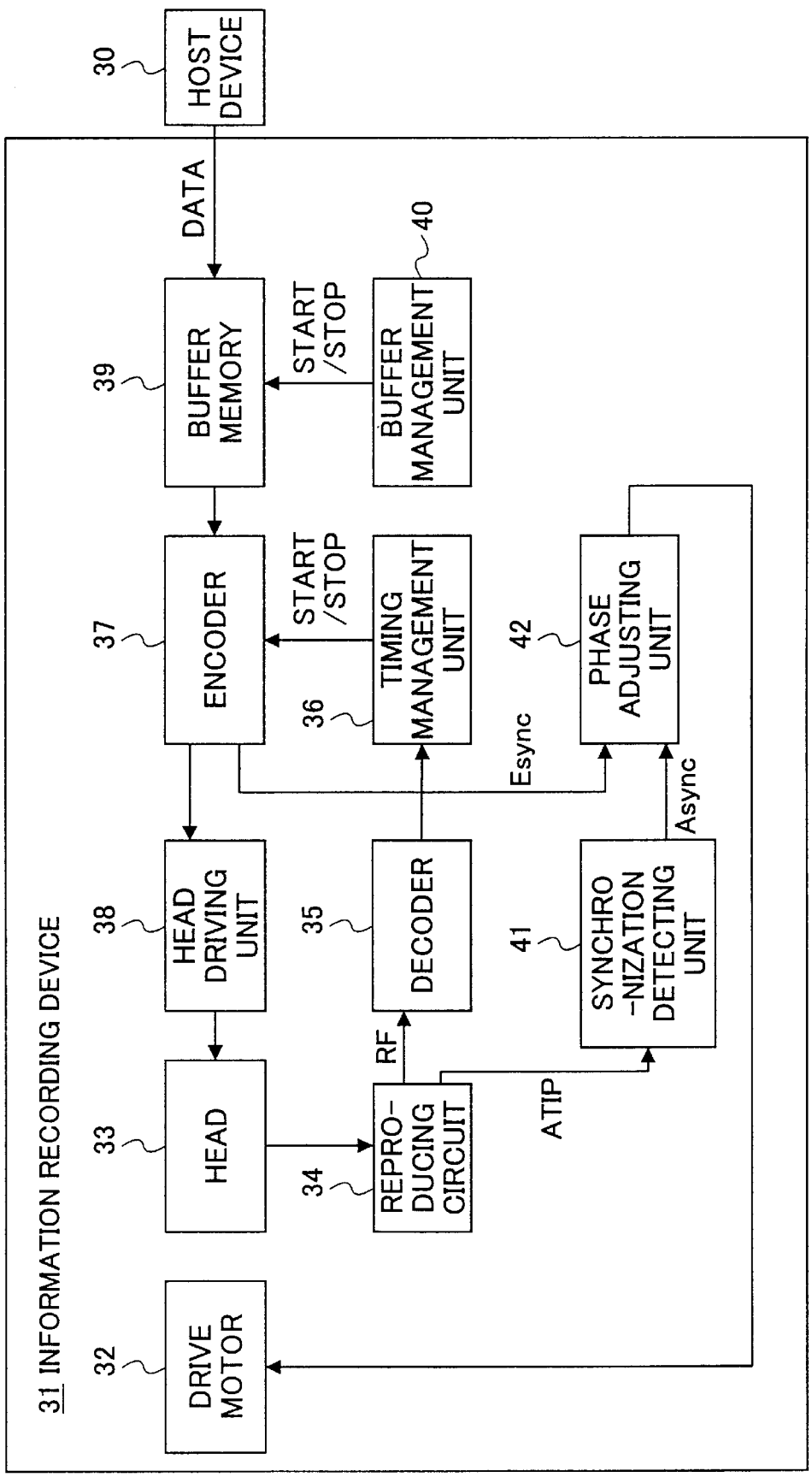
FIG. 11 is a block diagram showing a structure of an information recording system according to a fifth embodiment of the present invention.

A description will now be given of an information recording system according to a fifth embodiment of the present invention, with reference to FIG. 11. FIG. 11 is a block diagram showing a structure of the information recording system according to the fifth embodiment.

The information recording system shown in FIG. 11 includes a host device 30 and an information recording device 31. The host device 30 is an upper-level device outputting data to be recorded in a recording medium. In detail, the host device 30 has a control unit composed of a micro computer including a CPU, a ROM, a RAM and the like, and carries out processes such as data transmission to the information recording device 31. On the other hand, the information recording device 31 is a device that writes the data outputted by the host device 30 in the recording medium, and includes a drive motor 32, a head 33, a reproducing circuit 34, a decoder 35, a timing management unit 36, an encoder 37, a head driving unit 38, a buffer memory 39, a buffer management unit 40, a synchronization detecting unit 41 and a phase adjusting unit 42.

The drive motor 32 drives a recording medium not shown in the figures. The head 33 writes data in the recording medium or reads data from the recording medium by accessing to the recording medium. The reproducing circuit 34 processes a reproduced signal supplied from the head 33, and outputs the RF signal and the ATIP signal. As described above, the RF signal is the data reproduction signal read out from the recording medium. The ATIP signal is the absolute-location information signal that indicates the absolute location on the recording medium, and corresponds to the location synchronous signal.

The decoder 35 demodulates the RF signal supplied from the reproducing circuit 34. The timing management unit 36 reproduces data from a location preceding a previously suspended location if a data recording (writing) process is to be resumed, and starts the encoder 37 by matching an encoding timing to the end of the data recorded in the recording medium. The encoder 37 extracts data (recording data) to be recorded in the recording medium, from the buffer memory 39, and carries out an encoding process, an interleaving process, or a modulation process appropriately on the recording data. Subsequently, the encoder 37 creates a recording data series, and supplies the recording data series to the head driving unit 38.

The head driving unit 38 controls modulation driving performed by the head 33 for the data recording process, based on the recording data series received from the encoder 37. The buffer memory 39 receives the recording data outputted from the host device 30, and temporarily stores the recording data therein. The recording data temporarily stored in the buffer memory 39 is supplied to the encoder 37, based on an instruction from the buffer management unit 40, and is written in the recording medium by the head 33, which is controlled by the head driving unit 38.

A description will now be given of a buffer managing process of the buffer memory 39 carried out by the buffer management unit 40, with reference to FIG. 2.

The buffer memory 39 temporarily stores data supplied from the host device 30, and, then, supplies the data to the encoder 37. A size of data remained in the buffer memory 39 changes by a difference between a size of the data supplied from the host device 30 and a size of the data supplied from the buffer memory 39 to the encoder 37. If the size of the data supplied from the host device 30 continues being smaller than the size of the data supplied from the buffer memory 39 to the encoder 37, the size of the data remained in the buffer memory 39 keeps decreasing, and the buffer memory 39 becomes empty at the end. Consequently, data supply to the encoder 37 is cut, and the data recording process is suspended. Such an error is called the buffer under-run error, as described in the previous embodiments.

In order to prevent the buffer under-run error, the buffer management unit 40 suspends the data recording process to the recording medium, by suspending data supply from the buffer memory 39 to the encoder 37 if the size of the data remained in the buffer memory 39 becomes smaller than or equal to the second predetermined value (size) "size2". Additionally, the buffer management unit 40 does not resume the data recording process immediately after the size of the data remained in the buffer memory 39 exceeds the second predetermined value "size2" as a result of the data supply from the host device 30. Instead, the buffer management unit 40 resumes the data recording process when the size of the data remained in the buffer memory 39 becomes larger than or equal to the first predetermined value (size) "size1". It should be noted that the first predetermined value "size1" is set greater than the second predetermined value "size2".

For instance, the first predetermined value "size1" and the second predetermined value "size2" may be set to an upper limit of a buffer capacity in the buffer memory 39 and "0", respectively. Instead, the first predetermined value "size1" and the second predetermined value "size2" are preferably set to a value less than the upper limit by a small amount and a value larger than "0" by a small amount, so as to prevent data overflow and the buffer under-run error from occurring in the buffer memory 39 during a processing period for suspending or resuming the data recording process.

As described above, the buffer management unit 40 suspends or resumes the data recording process based on the size of the data remained in the buffer memory 39. Consequently, the information recording system can continuously write data whose size corresponds to the value obtained by subtracting the second predetermined value "size2" from the first predetermined value "size1", in the recording medium, from the beginning or the resumption of the data recording process to the next suspension of the data recording process, even if the size of the data supplied from the host device 30 to the buffer memory 39 is "0". The value obtained by subtracting the second predetermined value "size2" from the first predetermined value "size1" is the effective buffer size or the effective storage size (BufSize), and can be obtained by the above-described equation (1).

In FIG. 11, the synchronization detecting unit 41 detects a synchronous signal of the signal ATIP. The phase adjusting unit 42 compares a phase of the signal "Async" supplied from the synchronization detecting unit 41 with a phase of the signal "Esync" supplied from the encoder 37, and controls a scanning speed of the drive motor 32 so that a phase difference (a phase error) becomes "0" when the data recording process to the recording medium starts. As described above, the Async signal is the absolute-location synchronous signal or the location synchronous signal that is synchronous to an absolute location on the recording medium. The Esync signal is a recording-data synchronous signal that is synchronous to the recording data series outputted from the encoder 37. In other words, the phase adjusting unit 42 controls the scanning speed of the drive motor 32 to match the absolute location of the recording data on the recording medium.

A description will now be given of a phase adjusting process carried out by the phase adjusting unit 42 shown in FIG. 11, with reference to FIGS. 3A, 3B and 3C. The "START" position shown in FIG. 3A is a timing to start writing data in the recording medium. If the Async signal shown in FIG. 3B is late compared to the Esync signal shown in FIG. 3A at the START position, a positive phase error occurs. In such a case, the phase adjusting unit 42 controls the drive motor 32 to accelerate in accordance with the positive phase error, thereby accelerating a driving speed of the recording medium. Consequently, the phase of the Async signal synchronous to a location on the recording medium gradually catches up the phase of the Esync signal. The phase adjusting unit 42 continues accelerating the drive motor 32 until the phase error between the Esync signal and the Async signal becomes "0". FIG. 3C shows the average phase error.

Additionally, a response time of phase adjusting control carried out by the phase adjusting unit 42 is defined as a period from a time at which a unit phase error occurs to a time at which the unit phase error is lessen to 5% thereof, and is called as the 95% adjusting period (tADJ). The period tADJ shown in FIG. 3C corresponds to the shortest suspension period taken for suspending the data recording process.

If it is assumed that an output value of a system approaches a unit input value "A" of the system as time passes, the output value can be expressed as the above-described equation (2) by approximating such a system by use of a first-order lag system. For instance, the output value becomes A×0.95 at the time t=3T. The time 3T is the 95% adjusting period (tADJ). In the information recording device 31, the 95% adjusting period (tADJ), the effective buffer size (BufSize) and the data write speed (Wspeed) are set to have a relation as shown in the above-described equation (4).

According to the equation (4), if the size of the data supplied from the host device 30 to the buffer memory 39 is "0", a period in which the data recording process continues is the "BufSize/Wspeed". In other words, a time at which data whose size is indicated by the effective buffer size "BufSize" is removed from the buffer memory 39 is the "BufSize/Wspeed". The phase adjusting unit 42 controls the scanning speed of the drive motor 32 to complete 95% of the phase adjustment of the Async signal and the Esync signal in the period "BufSize/Wspeed", which is the shortest suspension period.

As described above, the information recording device 31 does not accumulate a location error of the recording data on the recording medium, even in the worst case in which the data supply speed from the host device 30 to the buffer memory 39 is extremely slow, and the suspension and the resumption of the data recording process are repeated in the shortest period. Additionally, the phase adjusting unit 42 corrects 95% of the phase error, and, thus, the phase error is not corrected completely. However, the correction of 95% of the phase error satisfies an industrial standard.

In the above-described information recording system according the fifth embodiment, the buffer memory 39 functions as a data storing unit that temporarily stores data therein. Additionally, the head 33, the encoder 37 and the head driving unit 38 function as a data writing unit that extracts the data from the data storing unit in order, and writes the data in a recording medium. The timing management unit 36 and the buffer management unit 40 function as a writing control unit that starts a data recording (writing) process by use of the data writing unit if a size of the data stored in the data storing unit exceeds a first predetermined value (size), and suspends the data recording process using the data writing unit if the size of the data stored in the data storing unit becomes less than a second predetermined value (size).

The phase adjusting unit 42 functions as a phase adjusting unit that starts adjusting a phase error between a signal synchronous to data that is to be recorded in the recording medium, and a signal synchronous to a location on the recording medium when the data recording process starts, and finishes adjusting the phase error so that the phase error becomes substantially zero before suspension of the data writing process. Additionally, the phase adjusting unit 42 functions as an adjusting control unit that controls the phase adjusting unit to finish the phase adjustment so that the phase error becomes substantially zero in the shortest suspension period, which is obtained from an effective storage size of the data storing unit determined by the first and second predetermined sizes, and a data write speed to the recording medium. Further, the phase adjusting unit 42 functions as a scanning-speed adjusting unit that reduces the phase error by adjusting the scanning speed of the recording medium.

A description will now be given of an information recording process carried out by the information recording device 31, with reference to FIG. 4. The information recording process includes the steps of storing data temporarily in the buffer memory 39, taking out the data from the buffer memory 39 sequentially, and writing the data in a recording medium.

At the step S1 shown in FIG. 4, the buffer management unit 40 decides whether the size of the data stored in the buffer memory 39 exceeds the first predetermined size "size1". If it is determined at the step S1 that the size of the data stored in the buffer memory 39 exceeds the first predetermined size "size1", the buffer management unit 40 proceeds to the step S2, and starts writing the data in the recording medium. Subsequently, at the step S3, the phase adjusting unit 42 starts adjusting the scanning speed of the recording medium by use of the drive motor 32 in order to reduce the phase error between the Esync signal synchronous to the data to be written in the recording medium and the Async signal synchronous to a location on the recording medium. The phase adjusting unit 42 finishes adjusting the phase error so that the phase error becomes substantially zero in the shortest suspension period before the suspension of the data recording process.

Subsequently, at the step S4, the buffer management unit 40 decides whether the size of the data stored in the buffer memory 39 becomes less than the second predetermined size "size2". If it is determined at the step S4 that the size of the data stored in the buffer memory 39 becomes less than the second predetermined size "size2", the buffer management unit 40 suspends the data recording process.

According to the fifth embodiment of the present invention as described above, the information recording device 31 does not accumulate a location error of recording data on a recording medium, even in a case in which a data supply speed from the host device 30 is extremely slow, and suspension and resumption of a data recording process are repeated in the shortest period. Therefore, the information recording system according to the fifth embodiment achieves a stable data recording process without a recording error. Additionally, the information recording device 31 can carry out the data recording process to the recording medium at a constant speed easily and steadily. Therefore, the information recording device 31 only needs to stabilize a physical characteristic at the time of recording the data to the recording medium, and can have a simple structure.

By always satisfying the equation (4) "tADJ<BufSize/Wspeed" in the above-described information recording system according to the fifth embodiment, the information recording device 31 possibly carries out a unstable control of the data recording process by picking up an ATIP signal detection noise or a resonance from the drive motor 32, since the response time during a regular data recording process is excessively fast. Accordingly, the response time is preferably set slower after a certain period passes since the beginning of the data recording process, or after the phase adjustment by the phase adjusting unit 42 ends.

A description will now be given of an information recording system according to a sixth embodiment of the present invention.

The structure of the information recording system according to the sixth embodiment is the same as the structure of the information recording system according to the fifth embodiment. However, the information recording system according to the sixth embodiment has a function of the phase adjusting unit 42 different from that of the information recording system according to the fifth embodiment.

The phase adjusting unit 42 of the information recording system according to the sixth embodiment includes the phase comparator 20, the amplifier 21, the driver 22 and the gain switching unit 23. The phase adjusting unit 42 detects the phase error between the Esync signal and the Async signal by use of the phase comparator 20. The amplifier 21 amplifies the phase error supplied from the phase comparator 20. Subsequently, the phase adjusting unit 42 drives the drive motor 32 by use of an output of the amplifier 21 through the driver 22.

The gain switching unit 23 switches the gain of the amplifier 21, thereby increasing or decreasing sensitivity of the phase adjustment. The increase in the gain corresponds to the shortening of the response time of the phase adjustment control. In other words, the phase adjusting unit 42 functions as an adjustment-sensitivity control unit that lowers the sensitivity of the phase adjustment after the above-described phase adjustment of the Async signal and the Esync signal.

A description will now be given of a phase adjusting process carried out by the phase adjusting unit 42 according to the sixth embodiment, with reference to FIG. 6. At the step S11 shown in FIG. 6, the gain switching unit 23 switches the gain of the amplifier 21 to a high gain that satisfies the condition "tADJ<BufSize/Wspeed" before starting the data recording process. Subsequently, at the step S12, the gain switching unit 23 decides whether the data recording process starts. If it is determined at the step S12 that the data recording process starts, the gain switching unit 23 proceeds to the step S13. The gain switching unit 23 decides whether a predetermined period, that is, the shortest suspension period, has passed, at the step S13. In detail, the gain switching unit 23 keeps the gain of the amplifier 21 high until the predetermined period passes. If it is determined at the step S13 that predetermined period has passed, the gain switching unit proceeds to the step S14, and switches the gain of the amplifier 21 from high to low, thereby lowering the sensitivity of the phase adjustment. The gain switching unit 23, then, keeps the gain of the amplifier 21 low until it is determined at the step S15 that the data recording process ends.

The information recording system according to the sixth embodiment lowers the sensitivity of the phase adjustment so that the above-described 95% adjusting period becomes larger than the tADJ, after data is written continuously in the recording medium since the beginning of the data recording process, and the phase adjustment is finished. Accordingly, for writing long and continuous data in the recording medium, the response time is set slow. Thus, the information recording system can carry out the stable data recording process, since the control of the information recording system is not affected by the ATIP signal detection noise or the resonance of the drive motor 32, which are picked up by the information recording system when the response time is fast.

Figure 12:
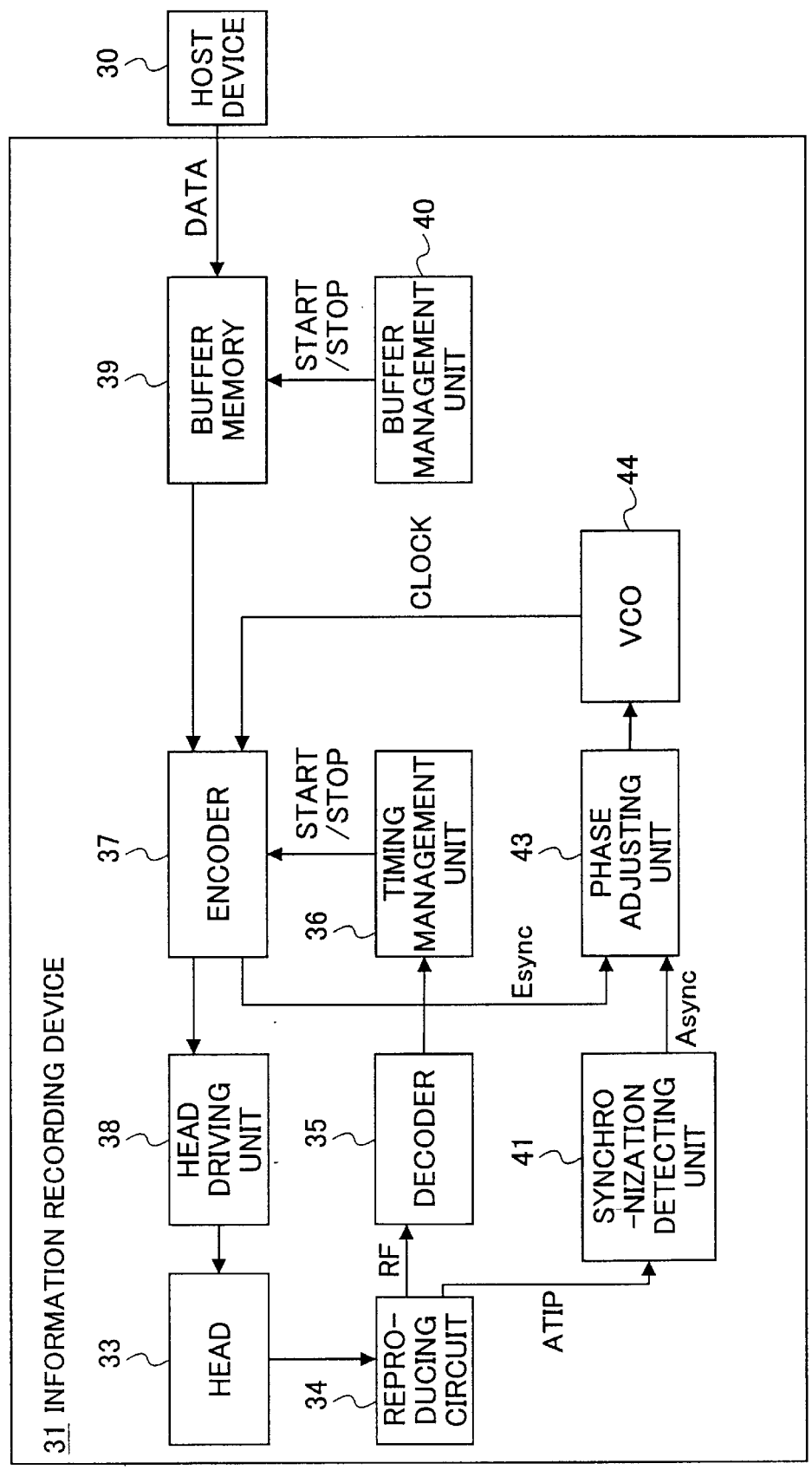
FIG. 12 is a block diagram showing a structure of an information recording system according to a seventh embodiment of the present invention.

A description will now be given of an information recording system according to a seventh embodiment of the present invention. FIG. 12 is a block diagram showing a structure of the information recording system according to the seventh embodiment. The information recording system shown in FIG. 12 includes the host device 30 and the information recording device 31. The host device 30 is the upper-level device outputting data to be recorded in a recording medium. In detail, the host device 30 has the control unit composed of a micro computer including a CPU, a ROM, a RAM and the like, and carries out processes such as the data transmission to the information recording device 31. On the other hand, the information recording device 31 is the device that writes the data outputted by the host device 30 in the recording medium, and includes the head 33, the reproducing circuit 34, the decoder 35, the timing management unit 36, the encoder 37, the head driving unit 38, the buffer memory 39, the buffer management unit 40, the synchronization detecting unit 41, a phase adjusting unit 43 and a VCO 44. A unit having the same unit number as a unit shown in FIG. 11 corresponds to the unit shown in FIG. 11, and, thus, the description is omitted.

Filtering is preferably performed to avoid an error caused by a noise and the like, since the VCO 44 responds faster than the drive motor 32. Thus, the information recording system according to the seventh embodiment controls a clock frequency of the encoder 37 by use of the phase adjusting unit 43 and the newly provided VCO 44, whereas the information recording system according to the previous embodiments controls the drive motor 32 by use of the phase adjusting unit 42.

The phase adjusting unit 43 initially detects the phase error between the synchronous Esync signal outputted from the encoder 37 and the Async signal outputted from the synchronization detecting unit 41, which is the signal synchronous to the absolute location on the recording medium. The phase adjusting unit 43, then, changes frequency of an output clock of the VCO 44 to eliminate the phase error.

Subsequently, the encoder 37 creates the recording data based on the output clock of the VCO 44. For instance, if the Esync signal is behind the Async signal as shown in FIGS. 9A and 9B, the frequency of the Esync signal becomes high by setting the frequency of the output clock of the VCO 44 to a high frequency. The phase of the Esync signal gradually becomes closer to the phase of the Async signal. At last, the phase error between the Async signal and the Esync signal becomes small enough so that the phases of the Async signal and the Esync signal correspond to each other.

As shown in FIG. 8, the above-described phase adjusting unit 43 includes the phase comparator 20 and the gain switching unit 23 shown in FIG. 5. Additionally, the phase adjusting unit 43 includes the amplifying/smoothing unit 24, which has a smoothing function in addition to an amplifying function.

The 95% adjusting period (tADJ) is defined as the response time of the phase adjustment also in the seventh embodiment. Additionally, the phase adjusting unit 43 sets the amplifying/smoothing unit 24 in the same manner as the phase adjusting unit 42 shown in FIG. 11 so that the phase adjusting unit 43 satisfies the condition "tADJ<BufSize/Wspeed". In other words, the phase adjusting unit 43 and the VCO 44 function as a clock-frequency adjusting unit that reduces the phase error by adjusting the frequency of the clock used for writing data in the recording medium. In addition, the gain switching unit 23 preferably switches gain of the amplifying/smoothing unit 24, thereby increasing or decreasing the sensitivity of the phase adjustment. The increasing gain corresponds to the shortening of the response time.

The phase adjusting unit 43 included in the information recording system according to the seventh embodiment carries out the phase adjusting process shown in FIG. 6. At the step S11 shown in FIG. 6, the gain switching unit 23 switches the gain of the amplifying/smoothing unit 24 to the high gain that satisfies the condition "tADJ<BufSize/Wspeed" before starting the data recording process. Subsequently, at the step S12, the gain switching unit 23 decides whether the data recording process starts. If it is determined at the step S12 that the data recording process starts, the gain switching unit 23 proceeds to the step S13. The gain switching unit 23 decides whether the predetermined period, that is, the shortest suspension period has passed, at the step S13. In detail, the gain switching unit 23 keeps the gain of the amplifier 21 high until the predetermined period passes. If it is determined at the step S13 that predetermined period has passed, the gain switching unit proceeds to the step S14, and switches the gain of the amplifier 21 from high to low, thereby lowering the sensitivity of the phase adjustment. The gain switching unit 23, then, keeps the gain of the amplifier 21 low until it is determined at the step S15 that the data recording process ends.

According to the seventh embodiment, the information recording system adjusts the frequency of the clock that is supplied to the encoder 37 and is used for recording the data so that the phase error decreases. Thus, the information recording system can easily and stably carry out the data recording process at a constant driving speed. Additionally, the information recording device 31 does not need to control the driving speed of the drive motor 32 since the driving speed is constant. Thus, the information recording system can reduce its cost, and can speed up a data-write access to the recording medium.

A description will now be given of a CD-R drive device according to an eighth embodiment of the present invention.

Figure 13:
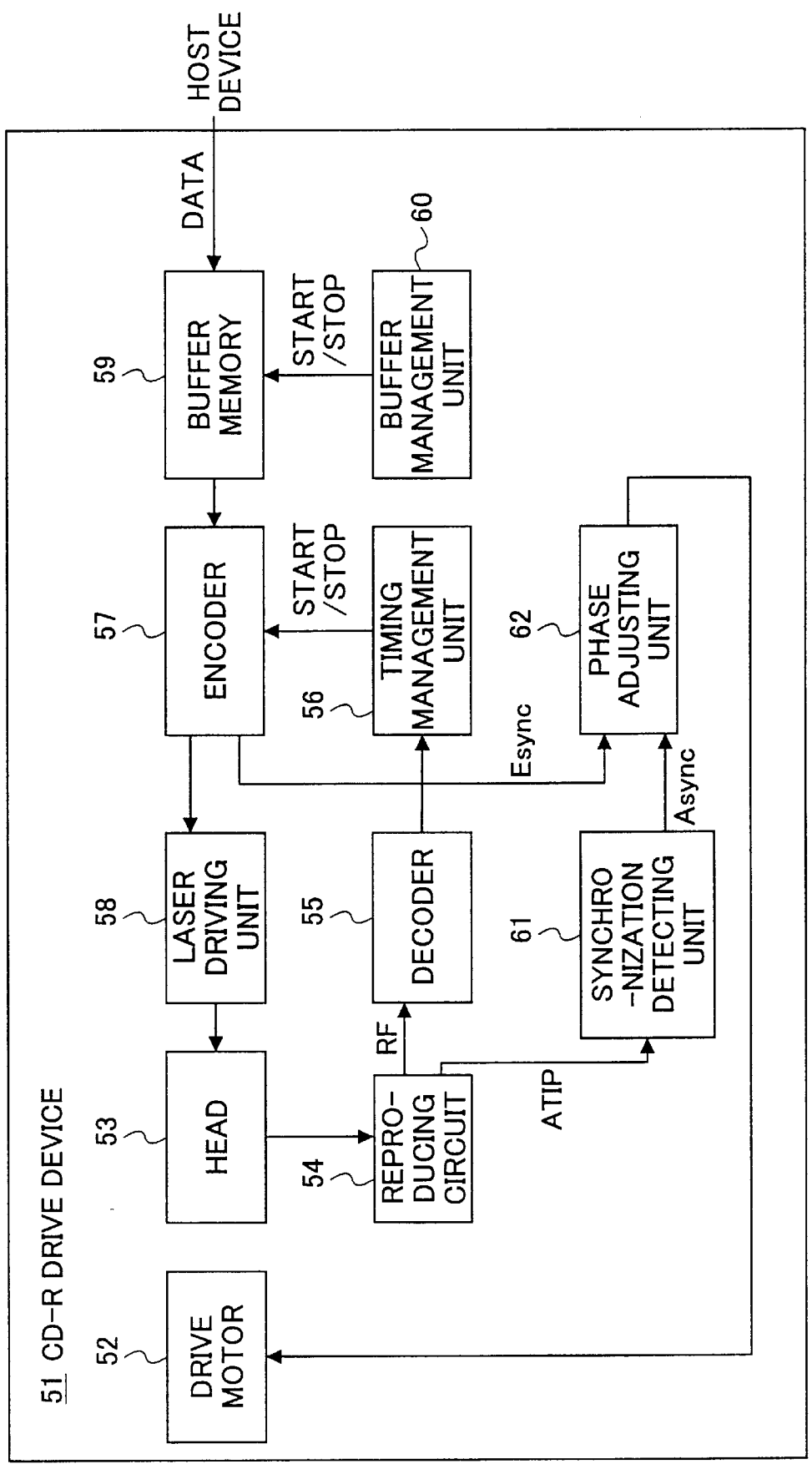
FIG. 13 is a block diagram showing a structure of a CD-R drive device according to an eighth embodiment of the present invention.

FIG. 13 is a block diagram showing a structure of a CD-R drive device 51 according to the eighth embodiment.

The CD-R drive device 51 shown in FIG. 13 is an optical-disk recording device, and includes a rotation motor 52, a head 53, a reproducing unit 54, a decoder 55, a timing management unit 56, an encoder 57, a laser driving unit 58, a buffer memory 59, a buffer management unit 60, a synchronization detecting unit 61 and a phase adjusting unit 62. The rotation motor 52 makes a CD-R not shown in the figures rotate. The CD-R is an optical disk or a recording medium, on which information can be recorded for more than once. The head 53 writes data in the CD-R or reads data from the CD-R by accessing to the CD-R.

The reproducing circuit 54 processes a reproduced signal supplied from the head 53, and outputs a RF signal and an ATIP (Absolute Time In Pre-groove) signal. The RF signal is a data reproduction signal read out from the CD-R. The ATIP signal is an absolute-location information signal that indicates an absolute location on the CD-R, and corresponds to a location synchronous signal.

The CD-R has a guide ditch slightly wobbled in a direction of a radius, and includes location information or address information by modulation of a wobbling frequency so that the absolute location on the CD-R is recognizable even if no information is recorded on the CD-R. A signal indicating such location information on the CD-R is called the ATIP signal. The ATIP signal can be detected without getting affected by laser modulation of recording data even if the data is being written in the CD-R. On the other hand, the RF signal is a reproduced signal of the data recorded on the CD-R, and is decoded by the decoder 55. Decoded data and timing signals are used for connecting the data correctly from a suspended part of the data at the time of resuming a data recording process, by taking a timing synchronization from the reproduced signal.

The decoder 55 demodulates the RF signal supplied from the reproducing circuit 54. The timing management unit 56 reproduces the data from a location preceding a previously suspended location if the data recording process is to be resumed, and starts the encoder 57 by matching an encoding timing to the end of the data recorded in the CD-R. Thus, the data can be connected accurately on the CD-R.

The encoder 57 extracts data to be recorded in the CD-R, from the buffer memory 59, and carries out an encoding process, an interleaving process, or a modulation process appropriately on the data. Subsequently, the encoder 57 creates a recording data series, and supplies the recording data series to the laser driving unit 58.

The laser driving unit 58 controls laser modulation driving performed by the head 53 for the data recording process, based on the recording data series received from the encoder 57. A recording pit corresponding to the data is formed on the CD-R because of application of laser onto the CD-R. The buffer memory 59 receives the data from a host device not shown in the figures, and temporarily stores the data therein. The data temporarily stored in the buffer memory 59 is supplied to the encoder 57, based on an instruction from the buffer management unit 60, and is written in the CD-R by the head 53, which is controlled by the laser driving unit 58.

A description will now be given of a buffer managing process of the buffer memory 59 carried out by the buffer management unit 60, with reference to FIG. 2.

The buffer memory 59 temporarily stores data supplied from the host device, and, then, supplies the data to the encoder 57. Meanwhile, a size of data remained in the buffer memory 59 changes by a difference between a size of the data supplied from the host device and a size of the data supplied from the buffer memory 59 to the encoder 57. If the size of the data supplied from the host device to the buffer memory 59 continues being smaller than the size of the data supplied from the buffer memory 59 to the encoder 57, the size of the data remained in the buffer memory 59 keeps decreasing, and the buffer memory 59 becomes empty at the end. Consequently, data supply to the encoder 57 is cut, and the data recording process is suspended. Such an error is called the buffer under-run error.

In order to prevent the buffer under-run error, the buffer management unit 60 suspends the data recording process to the CD-R, by suspending data supply from the buffer memory 59 to the encoder 57 if the size of the data remained in the buffer memory 59 becomes smaller than or equal to the second predetermined size "size2" (an arrow D1). Additionally, the buffer management unit 60 does not resume the data recording process immediately after the size of the data remained in the buffer memory 59 exceeds the second predetermined size "size2" as a result of the data supply from the host device (an arrow D2). Instead, the buffer management unit 60 resumes the data recording process when the size of the data remained in the buffer memory 59 becomes larger than or equal to the first predetermined size "size1" (an arrow D3). The first predetermined size "size1" is set greater than the second predetermined size "size2".

For example, the first predetermined size "size1" and the second predetermined size "size2" may be set to an upper limit of a buffer capacity in the buffer memory 59 and "0", respectively. Instead, the first predetermined size "size1" and the second predetermined size "size2" are preferably set to a value less than the upper limit by a small amount and a value larger than "0" by a small amount, so as to prevent data overflow and the buffer under-run error from occurring in the buffer memory 59 during a processing period for suspending or resuming the data recording process.

As described above, the buffer management unit 60 suspends or resumes the data recording process based on the size of the data remained in the buffer memory 59. Consequently, the CD-R drive device 51 can continuously write data whose size corresponds to a value obtained by subtracting the second predetermined size "size2" from the first predetermined size "size1", in the CD-R, from the beginning or the resumption of the data recording process to the next suspension of the data recording process, even if the size of the data supplied from the host device to the buffer memory 59 is "0". The value obtained by subtracting the second predetermined size "size2" from the first predetermined size "size1" is called the effective buffer size or the effective storage size (BufSize), and is obtained from the above-described equation (1).

In FIG. 13, the synchronization detecting unit 61 detects a synchronous signal of the ATIP signal. The synchronous signal is called an ATIP synchronous signal (Async), and is included in each sector of the CD-R. Each sector of a CD has an about 16 mm length on the CD. It takes $1/75$ second to read each sector at a standard line speed. A data capacity of each sector is 2048 bytes for a computer use. On the other hand, the encoder 57 outputs a signal synchronous to the recording data series. This signal is called an Encoder Subcode Synchronous signal (Esync), and occurs in each sector of the CD.

The phase adjusting unit 62 compares a phase of the Async signal supplied from the synchronization detecting unit 61 with a phase of the Esync signal supplied from the encoder 57, and controls a rotational speed of the rotation motor 52 corresponding to a scanning speed so that a phase difference (a phase error) becomes "0", when the data recording process to the CD-R starts. The Async signal is an absolute-location synchronous signal or a location synchronous signal that is synchronous to an absolute location on the CD-R. The Esync signal is a recording-data synchronous signal that is synchronous to the recording data series outputted from the encoder 57. In other words, the phase adjusting unit 62 controls the rotational speed of the rotation motor 52 to match the absolute location of the data on the CD-R.

A description will now be given of a phase adjusting process carried out by the phase adjusting unit 62, with reference to FIGS. 3A, 3B and 3C. The "START" position shown in FIG. 3A is a timing to start writing data in the CD-R. If the Async signal shown in FIG. 3B is late compared to the Esync signal shown in FIG. 3A at the START position, a positive phase error occurs. In such a case, the phase adjusting unit 62 controls the rotation motor 52 to accelerate in accordance with the positive phase error, thereby accelerating a rotational speed of the CD-R. Consequently, the phase of the Async signal synchronous to a location on the CD-R gradually catches up the phase of the Esync signal. The phase adjusting unit 62 continues accelerating the rotation motor 52 until the phase error between the Esync signal and the Async signal becomes "0". FIG. 3C shows an average phase error.

Additionally, a response time of phase adjusting control carried out by the phase adjusting unit 62 is defined as a period from a time at which a unit phase error occurs to a time at which the unit phase error is lessen to 5% thereof, and is called as the 95% adjusting period (tADJ). The period tADJ shown in FIG. 3C corresponds to the shortest suspension period taken for suspending the data recording process.

If it is assumed that an output value of a system approaches a unit input value "A" of the system as time passes, the output value can be expressed as the above-described equation (2) by approximating such a system by use of a first-order lag system. For instance, the output value becomes A×0.95 at the time t=3T. The time 3T is the 95% adjusting period (tADJ). Additionally, the phase error adjusted by the phase adjusting control is expressed as the above-described equation (3). A period taken for reducing the phase error at the beginning of the phase adjusting control to 5% of the error is 3T, based on approximation using the equation (3). In the CD-R drive device, the 95% adjusting period (tADJ), the effective buffer size (BufSize) and the data write speed (Wspeed) are set to have a relation as shown in the above-described equation (4).

As shown in the equation (4), if the size of the data supplied from the host device to the buffer memory 59 is "0", a period in which the data recording process continues is "BufSize/Wspeed". In other words, if the size of the data supplied from the host device to the buffer memory 59 is "0", a time at which data whose size is indicated by the effective buffer size "BufSize" is removed from the buffer memory 59 is the "BufSize/Wspeed". In detail, the phase adjusting unit 62 controls the rotational speed of the rotation motor 52 to complete 95% of the phase adjustment of the Async signal and the Esync signal in the period "BufSize/Wspeed", which is the shortest suspension period.

As described above, the CD-R drive device does not accumulate a location error of the recording data on the CD-R, even in the worst case in which the data supply speed from the host device to the buffer memory 59 is extremely slow, and the suspension and the resumption of the data recording process are repeated in the shortest period. Additionally, the phase adjusting unit 62 corrects 95% of the phase error, and, thus, the phase error is not corrected completely. However, the correction of 95% of the phase error satisfies an industrial standard.

In the above-described CD-R drive device, the buffer memory 59 functions as a data storing unit that temporarily stores data therein. Additionally, the head 53, the encoder 57 and the laser driving unit 58 function as a data writing unit that extracts the data from the data storing unit in order, and writes the data on an optical disk by applying laser onto the optical disk. The timing management unit 56 and the buffer management unit 60 function as a writing control unit that starts a data recording (writing) process by use of the data writing unit if a size of the data stored in the data storing unit exceeds a first predetermined value (size), and suspends the data recording process using the data writing unit if the size of the data stored in the data storing unit becomes less than a second predetermined value (size).

The phase adjusting unit 62 functions as a phase adjusting unit that starts adjusting a phase error between a signal synchronous to data that is to be recorded in the optical disk, and a signal synchronous to a location on the optical disk when the data recording process starts, and finishes adjusting the phase error so that the phase error becomes substantially zero before suspension of the data writing process. Additionally, the phase adjusting unit 62 functions as an adjusting control unit that controls the phase adjusting unit to finish the phase adjustment so that the phase error becomes substantially zero in the shortest suspension period, which is obtained from an effective storage size of the data storing unit determined by the first and second predetermined sizes, and a data write speed to the optical disk. Further, the phase adjusting unit 62 functions as a scanning-speed adjusting unit that reduces the phase error by adjusting the scanning speed of the optical disk.

A description will now be given of an information recording process carried out by the CD-R device. The information recording process includes the steps of storing data temporarily in the buffer memory 59, taking out the data from the buffer memory 59 sequentially, and writing the data in an optical disk.

At the step S1 shown in FIG. 4, the buffer management unit 60 decides whether the size of the data stored in the buffer memory 59 exceeds the first predetermined size "size1". If it is determined at the step S1 that the size of the data stored in the buffer memory 59 exceeds the first predetermined size "size1", the buffer management unit 60 proceeds to the step S2, and starts writing the data in the CD-R. Subsequently, at the step S3, the phase adjusting unit 62 starts adjusting the rotational speed of the CD-R by use of the rotation motor 52 in order to reduce the phase error between the Esync signal synchronous to the data to be written in the CD-R and the Async signal synchronous to a location on the CD-R. The phase adjusting unit 62 finishes adjusting the phase error so that the phase error becomes substantially zero in the shortest suspension period before the suspension of the data recording process.

Subsequently, at the step S4, the buffer management unit 60 decides whether the size of the data stored in the buffer memory 59 becomes less than the second predetermined size "size2". If it is determined at the step S4 that the size of the data stored in the buffer memory 59 becomes less than the second predetermined size "size2", the buffer management unit 60 suspends the data recording process.

Figure 14:
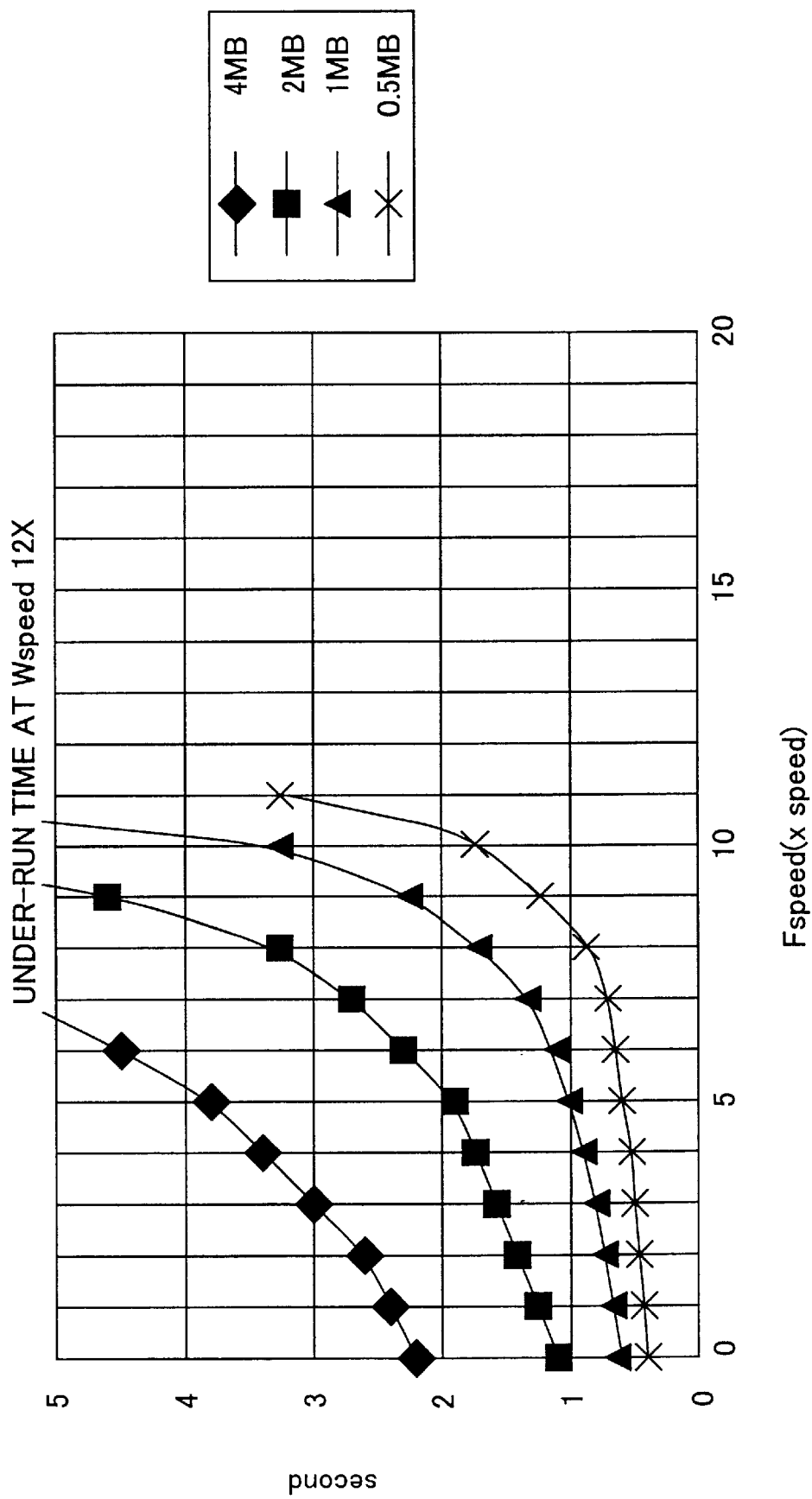
FIG. 14 is a graph showing a relation between a data supply speed of a host device and a period in which a data recording process to a CD-R continues in a case in which a data write speed is 12×.
Figure 15:
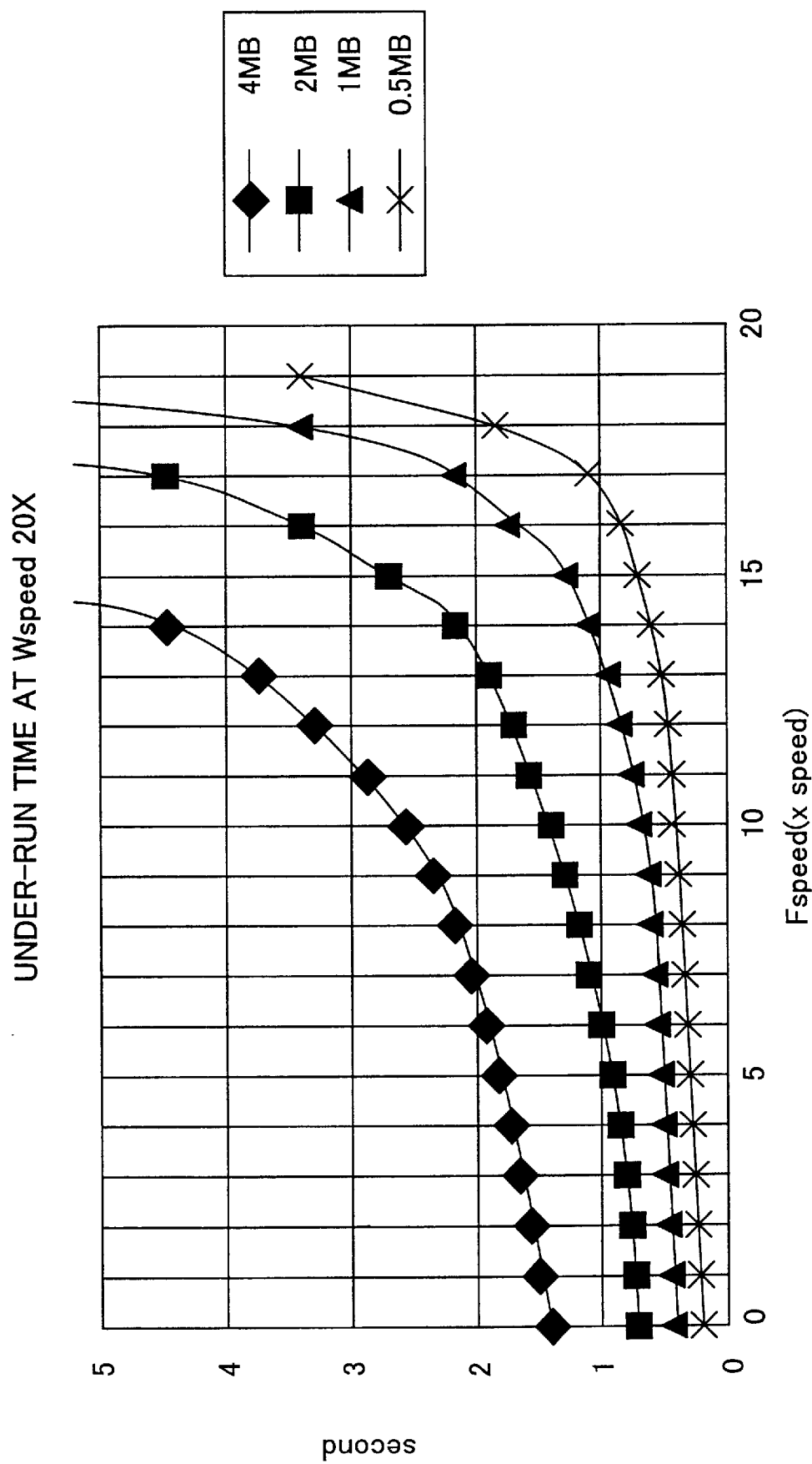
FIG. 15 is a graph showing a relation between the data supply speed of the host device and the period in which the data recording process to the CD-R continues in a case in which the data write speed is 20×.

A description will now be given of an information recording process in a case in which a data write speed of the CD-R drive device to the CD-R is a 12× or 20× speed. FIG. 14 is a graph showing a relation between a data supply speed (Fspeed) of a host device to the CD-R drive device, and a period (a continuous recording period) in which a data recording process to the CD-R continues in a case in which the data write speed (Wspeed) is 12×. Additionally, FIG. 15 is a graph showing a relation between the data supply speed (Fspeed) of the host device and the period in which the data recording process to the CD-R continues in a case in which the data write speed (Wspeed) is 20×. The period is plotted for each data supply speed of the host device set on the horizontal axis in FIGS. 14 and 15. The effective buffer size (BufSize) of the buffer memory 59 is used as a parameter for FIGS. 14 and 15. It should be noted that a data write speed 1× is a standard speed for the CD, and is 150 Kbyte/second. Thus, the data write speeds 12× and 20× are 1800 Kbyte/second and 3000 Kbyte/second, respectively.

The continuous recording period "t" can be obtained by the following equation (5).

$$t = BufSize/(Wspeed - Fspeed) \quad (5)$$

According to the equation (5), the continuous recording period "t" is infinite, if the data supply speed (Fspeed) is equal to the data write speed (Wspeed), or if the data supply speed is faster than the data write speed. Additionally, the slower the data supply speed is, the shorter the continuous recording period is. If the data supply speed (Fspeed) is "0", the continuous recording period "t" is obtained by the following equation (6).

$$t = BufSize/Wspeed \quad (6)$$

For instance, if the data write speed (Wspeed) and the effective buffer size (BufSize) are 12× (1800 Kbyte/second) and 0.5 Mbyte (500 Kbyte) respectively, the continuous recording period "t" is about 0.28 second. The continuous recording period "t" corresponds to the shortest suspension period since the data supply speed is "0" in the equation (6). Accordingly, the CD-R drive device can mostly eliminate accumulation of recording location errors even in the worst case, by setting the 95% adjusting period (tADJ) to be less than 0.28 second. Similarly, if the data write speed and the effective buffer size are 20× (3000 Kbyte/second) and 0.5 Mbyte (500 Kbyte) respectively, the continuous recording period is about 0.17 second. Thus, the CD-R drive device can mostly eliminate the accumulation of the recording location errors even in the worst case, by setting the 95% adjusting period (tADJ) to be less than 0.17 second.

It is obvious that the smaller the buffer size of the buffer memory 59 is, the lower the cost is. The faster the data write speed of the CD-R drive device is, the higher the convenience of the CD-R drive device is.

According to the eighth embodiment of the present invention as described above, the CD-R drive device does not accumulate a location error of recording data on the CD-R, even in a case in which the data supply speed from the host device is extremely slow, and suspension and resumption of the data recording process are repeated in the shortest period. Therefore, the CD-R drive device according to the eighth embodiment achieves a stable data recording process without a recording error. Additionally, the CD-R drive device can carry out the data recording process to the CD-R at a constant speed easily and steadily. Therefore, the CD-R drive device only needs to stabilize a physical characteristic at the time of recording the data to the CD-R, and can have a simple structure.

By always satisfying the equation (4) "tADJ<BufSize/Wspeed" in the above-described CD-R drive device according to the eighth embodiment, the CD-R drive device possibly carries out a unstable control of the data recording process by picking up an ATIP signal detection noise or a resonance from the rotation motor 52, since the response time during a regular data recording process is excessively fast. Accordingly, the response time is preferably set slower after a certain period passes since the beginning of the data recording process, or after the phase adjustment by the phase adjusting unit 62 ends.

A description will now be given of a CD-R drive device according to a ninth embodiment of the present invention.

The structure of the CD-R drive device according to the ninth embodiment of the present invention is the same as the structure of the CD-R drive device according to the eighth embodiment. However, the CD-R drive device according to the ninth embodiment has a function of the phase adjusting unit 62 different from that of the CD-R drive device according to the eighth embodiment.

The phase adjusting unit 62 includes the phase comparator 20, the amplifier 21, the driver 22 and the gain switching unit 23, as shown in FIG. 5. The phase adjusting unit 62 detects the phase error between the Esync signal and the Async signal by use of the phase comparator 20. The amplifier 21 amplifies the phase error supplied from the phase comparator 20. Subsequently, the phase adjusting unit 62 drives the rotation motor 52 by use of an output of the amplifier 21 through the driver 22.

The gain switching unit 23 switches the gain of the amplifier 21, thereby increasing or decreasing sensitivity of the phase adjustment. The increase in the gain corresponds to the shortening of the response time of the phase adjustment control. In other words, the phase adjusting unit 62 whose structure is shown in FIG. 5 functions as an adjustment-sensitivity control unit that lowers the sensitivity of the phase adjustment after the above-described phase adjustment of the Async signal and the Esync signal.

A description will now be given of a phase adjusting process carried out by the phase adjusting unit 62, with reference to FIG. 6. At the step S11 shown in FIG. 6, the gain switching unit 23 switches the gain of the amplifier 21 to a high gain that satisfies the condition "tADJ<BufSize/Wspeed" before starting the data recording process. Subsequently, at the step S12, the gain switching unit 23 decides whether the data recording process starts. If it is determined at the step S12 that the data recording process starts, the gain switching unit 23 proceeds to the step S13. The gain switching unit 23 decides whether a predetermined period, that is, the shortest suspension period has passed, at the step S13. In detail, the gain switching unit 23 keeps the gain of the amplifier 21 high until the predetermined period passes. If it is determined at the step S13 that predetermined period has passed, the gain switching unit proceeds to the step S14, and switches the gain of the amplifier 21 from high to low, thereby lowering the sensitivity of the phase adjustment. The gain switching unit 23, then, keeps the gain of the amplifier 21 low until it is determined at the step S15 that the data recording process ends.

The CD-R drive device according to the ninth embodiment lowers the sensitivity of the phase adjustment so that the above-described 95% adjusting period becomes larger than the tADJ, after data is written continuously in the CD-R since the beginning of the data recording process, and the phase adjustment is finished. Accordingly, for writing long and continuous data in the CD-R, the response time is set slow. Thus, the CD-R drive device can carry out the stable data recording process, since the control of the CD-R drive device is not affected by the ATIP signal detection noise or the resonance of the rotation motor 52, which are picked up by the CD-R drive device when the response time is fast.

Figure 16:
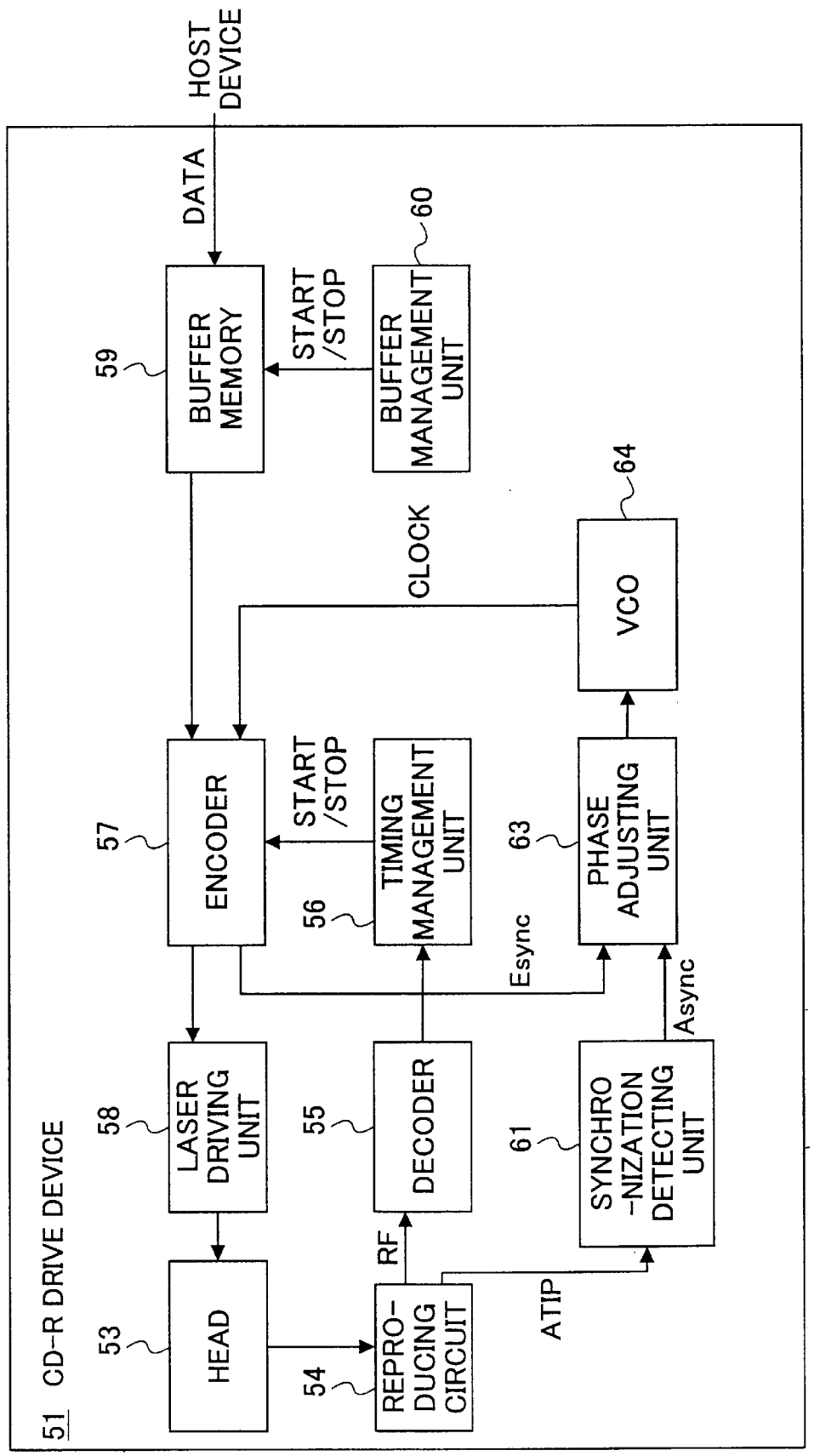
FIG. 16 is a block diagram showing a structure of a CD-R drive device according to a tenth embodiment of the present invention.

A description will now be given of a CD-R drive device according to a tenth embodiment of the present invention. FIG. 16 is a block diagram showing a structure of the CD-R drive device according to the tenth embodiment. The CD-R drive device shown in FIG. 16 includes the head 53, the reproducing circuit 54, the decoder 55, the timing management unit 56, the encoder 57, the laser driving unit 58, the buffer memory 59, the buffer management unit 60, the synchronization detecting unit 61, a phase adjusting unit 63 and a variable frequency oscillator (VCO) 64. A unit having the same unit number as a unit shown in FIG. 13 corresponds to the unit shown in FIG. 13, and, thus, the description is omitted.

Filtering is preferably performed to avoid an error caused by a noise and the like, since the VCO 64 responds faster than the rotation motor 52. Thus, the CD-R drive device according to the tenth embodiment controls a clock frequency of the encoder 57 by use of the phase adjusting unit 63 and the newly provided VCO 64, whereas the CD-R drive device according to the previous embodiments controls the rotation motor 52 by use of the phase adjusting unit 62.

The phase adjusting unit 63 initially detects the phase error between the synchronous Esync signal outputted from the encoder 57 and the Async signal outputted from the synchronization detecting unit 61, which is the signal synchronous to the absolute location on the CD-R. The phase adjusting unit 63, then, changes frequency of an output clock of the VCO 64 to eliminate the phase error. Subsequently, the encoder 57 creates the recording data based on the output clock of the VCO 64. For instance, if the Esync signal is behind the Async signal as shown in FIGS. 9A and 9B, the frequency of the Esync signal becomes high by setting the frequency of the output clock of the VCO 64 to a high frequency. Thus, the phase of the Esync signal gradually becomes closer to the phase of the Async signal. The phase error between the Async signal and the Esync signal eventually becomes small enough so that the phases of the Async signal and the Esync signal correspond to each other.

As shown in FIG. 8, the above-described phase adjusting unit 63 includes the phase comparator 20 and the gain switching unit 23. Additionally, the phase adjusting unit 63 includes the amplifying/smoothing unit 24, which has a smoothing function in addition to an amplifying function.

The 95% adjusting period (tADJ) is defined as the response time of the phase adjustment also in the tenth embodiment. Additionally, the phase adjusting unit 63 sets the amplifying/smoothing unit 24 in the same manner as the phase adjusting unit 62 shown in FIG. 5 so that the phase adjusting unit 63 satisfies the condition "tADJ<BufSize/Wspeed". In other words, the phase adjusting unit 63 and the VCO 64 function as a clock-frequency adjusting unit that reduces the phase error by adjusting the frequency of the clock used for writing data in the CD-R. In addition, the gain switching unit 23 preferably switches gain of the amplifying/smoothing unit 24, thereby increasing or decreasing the sensitivity of the phase adjustment. The increasing gain corresponds to the shortening of the response time.

The phase adjusting unit 63 carries out the phase adjusting process shown in FIG. 6. At the step S11 shown in FIG. 6, the gain switching unit 23 switches the gain of the amplifying/smoothing unit 24 to the high gain that satisfies the condition "tADJ<BufSize/Wspeed" before starting the data recording process. Subsequently, at the step S12, the gain switching unit 23 decides whether the data recording process starts. If it is determined at the step S12 that the data recording process starts, the gain switching unit 23 proceeds to the step S13. The gain switching unit 23 decides whether the predetermined period, that is, the shortest suspension period has passed, at the step S13. In detail, the gain switching unit 23 keeps the gain of the amplifier 21 high until the predetermined period passes. If it is determined at the step S13 that predetermined period has passed, the gain switching unit proceeds to the step S14, and switches the gain of the amplifier 21 from high to low, thereby lowering the sensitivity of the phase adjustment. The gain switching unit 23, then, keeps the gain of the amplifier 21 low until it is determined at the step S15 that the data recording process ends.

A description will now be given of an information recording process carried out by the CD-R drive device according to the tenth embodiment, with reference to the flowchart shown in FIG. 10.

At the step S21 shown in FIG. 10, the buffer management unit 60 decides whether the size of data stored in the buffer memory 59 becomes larger than the first predetermined size "size1" during the data recording process. If it is determined at the step S21 that the size of the data stored in the buffer memory 59 is larger than the first predetermined size "size1", the buffer management unit 60 starts writing the data in the CD-R, at the step S22. Subsequently, at the step S23, the phase adjusting unit 63 and the VCO 64 start adjusting the frequency of the clock supplied to the encoder 57 so that the phase error between the Async signal and the Esync signal decreases. The phase adjusting unit 63 and the VCO 64 fix the phase error in the shortest suspension period before the suspension of the data recording process.

At the step S24, the buffer management unit 60 decides whether the size of the data stored in the buffer memory 59 is less than the second predetermined size "size2". If it is determined at the step S24 that the size of the data stored in the buffer memory 59 is less than the second predetermined size "size2", the buffer management unit 60 stops the data recording process, at the step S25.

In the above-described process, the rotation motor 52 is controlled so that the frequency of the Async signal is constant if the clock frequency of the encoder 57 is constant. In other words, the rotation motor 52 is controlled to have a CLV (Constant Linear Velocity). On the other hand, by setting the rotational speed of the rotation motor 52 to a CAV (Constant Angular Velocity) and controlling the clock frequency of the encoder 57, the clock frequency of the encoder 57 becomes automatically high as the head 53 moves toward the outer circumference of the CD-R, thereby achieving the data recording process at the CAV.

According to the tenth embodiment, the CD-R drive device adjusts the frequency of the clock that is supplied to the encoder 57 and is used for recording the data so that the phase error decreases. Thus, the CD-R drive device can easily and stably carry out the data recording process at a constant angular velocity (CAV). Additionally, the CD-R drive device does not need to control the rotational speed of the rotation motor 52 since the angular velocity is constant. The CD-R drive device according to the tenth embodiment can reduce its cost, and can speed up a data-write access to the CD-R.

Figure 17:
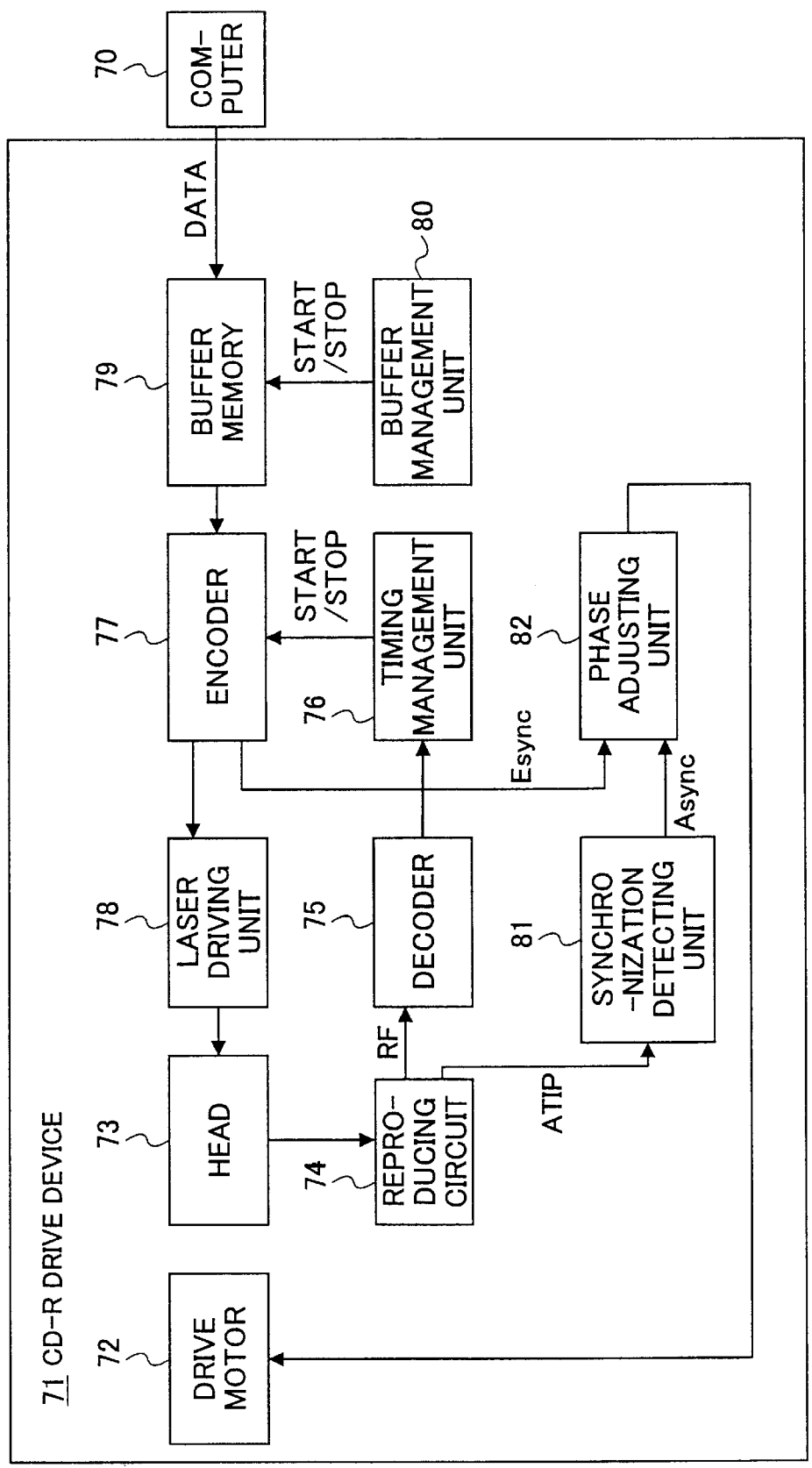
FIG. 17 is a block diagram showing a structure of an optical-disk recording system according to an eleventh embodiment of the present invention.

A description will now be given of an optical-disk recording system according to an eleventh embodiment of the present invention, with reference to FIG. 17. FIG. 17 is a block diagram showing a structure of the optical-disk recording system according to the eleventh embodiment.

The optical-disk recording system shown in FIG. 17 includes a computer 70 and a CD-R drive device 71. The computer 70 outputs data to be recorded in the CD-R. In detail, the computer 70 has a control unit composed of a micro computer including a CPU, a ROM, a RAM and the like, and carries out processes such as data transmission to the CD-R drive device 71. On the other hand, the CD-R drive device 71 writes the data outputted by the computer 70 in the CD-R, and includes a rotation motor 72, a head 73, a reproducing circuit 74, a decoder 75, a timing management unit 76, an encoder 77, a laser driving unit 78, a buffer memory 79, a buffer management unit 80, a synchronization detecting unit 81 and a phase adjusting unit 82.

The rotation motor 72 rotates the CD-R not shown in the figures. The CD-R is an optical disk, on which information can be recorded more than once. The head 73 writes data in the CD-R or reads data from the CD-R by accessing to the CD-R. The reproducing circuit 74 processes a reproduced signal supplied from the head 73, and outputs the RF signal and the ATIP signal. As described above, the RF signal is the data reproduction signal read out from the CD-R. The ATIP signal is the absolute-location information signal that indicates the absolute location on the CD-R, and corresponds to the location synchronous signal.

The decoder 75 demodulates the RF signal supplied from the reproducing circuit 74. The timing management unit 76 reproduces data from a location preceding a previously suspended location if a data recording (writing) process is to be resumed, and starts the encoder 77 by matching an encoding timing to the end of the data recorded in the CD-R. The encoder 77 extracts data (recording data) to be recorded in the CD-R, from the buffer memory 79, and carries out an encoding process, an interleaving process, or a modulation process appropriately on the recording data. Subsequently, the encoder 77 creates a recording data series, and supplies the recording data series to the laser driving unit 78.

The laser driving unit 78 controls modulation driving performed by the head 73 for the data recording process, based on the recording data series received from the encoder 77. The buffer memory 79 receives the recording data outputted from the computer 70, and temporarily stores the recording data therein. The recording data temporarily stored in the buffer memory 79 is supplied to the encoder 77, based on an instruction from the buffer management unit 80, and is written in the CD-R by the head 73, which is controlled by the laser driving unit 78.

A description will now be given of a buffer managing process of the buffer memory 79 carried out by the buffer management unit 80, with reference to FIG. 2.

The buffer memory 79 temporarily stores data supplied from the computer 70, and, then, supplies the data to the encoder 77. A size of data remained in the buffer memory 79 changes by a difference between a size of the data supplied from the computer 70 and a size of the data supplied from the buffer memory 79 to the encoder 77. If the size of the data supplied from the computer 70 continues being smaller than the size of the data supplied from the buffer memory 79 to the encoder 77, the size of the data remained in the buffer memory 79 keeps decreasing, and the buffer memory 79 becomes empty at the end. Consequently, data supply to the encoder 77 is cut, and the data recording process is suspended. Such an error is called the buffer under-run error, as described in the previous embodiments.

In order to prevent the buffer under-run error, the buffer management unit 80 suspends the data recording process to the CD-R, by suspending data supply from the buffer memory 79 to the encoder 77 if the size of the data remained in the buffer memory 79 becomes smaller than or equal to the second predetermined size "size2". Additionally, the buffer management unit 80 does not resume the data recording process immediately after the size of the data remained in the buffer memory 79 exceeds the second predetermined size "size2" as a result of the data supply from the computer 70. Instead, the buffer management unit 80 resumes the data recording process when the size of the data remained in the buffer memory 79 becomes larger than or equal to the first predetermined size "size1". It should be noted that the first predetermined size "size1" is set greater than the second predetermined size "size2".

For instance, the first predetermined size "size1" and the second predetermined size "size2" may be set to an upper limit of a buffer capacity in the buffer memory 79 and "0", respectively. Instead, the first predetermined size "size1" and the second predetermined size "size2" are preferably set to a value less than the upper limit by a small amount and a value larger than "0" by a small amount, so as to prevent data overflow and the buffer under-run error from occurring in the buffer memory 79 during a processing period for suspending or resuming the data recording process.

As described above, the buffer management unit 80 suspends or resumes the data recording process based on the size of the data remained in the buffer memory 79. Consequently, the optical-disk recording system can continuously write data whose size corresponds to the value obtained by subtracting the second predetermined size "size2" from the first predetermined size "size1", in the CD-R, from the beginning or the resumption of the data recording process to the next suspension of the data recording process, even if the size of the data supplied from the computer 70 to the buffer memory 79 is "0". The value obtained by subtracting the second predetermined size "size2" from the first predetermined size "size1" is the effective buffer size or the effective storage size (BufSize), and can be obtained by the above-described equation (1).

In FIG. 17, the synchronization detecting unit 81 detects a synchronous signal of the signal ATIP. The phase adjusting unit 82 compares a phase of the signal "Async" supplied from the synchronization detecting unit 81 with a phase of the signal "Esync" supplied from the encoder 77, and controls a rotational speed of the rotation motor 72 so that a phase difference (a phase error) becomes "0" when the data recording process to the CD-R starts. As described above, the Async signal is the absolute-location synchronous signal or the location synchronous signal that is synchronous to an absolute location on the CD-R. The Esync signal is a recording-data synchronous signal that is synchronous to the recording data series outputted from the encoder 77. In other words, the phase adjusting unit 82 controls the rotational speed of the rotation motor 72 to match the absolute location of the recording data on the CD-R.

A description will now be given of a phase adjusting process carried out by the phase adjusting unit 82 shown in FIG. 17, with reference to FIGS. 3A, 3B and 3C. The "START" position shown in FIG. 3A is a timing to start writing data in the CD-R. If the Async signal shown in FIG. 3B is late compared to the Esync signal shown in FIG. 3A at the START position, a positive phase error occurs. In such a case, the phase adjusting unit 82 controls the rotation motor 72 to accelerate in accordance with the positive phase error, thereby accelerating the rotational speed of the CD-R. Consequently, the phase of the Async signal synchronous to a location on the CD-R gradually catches up the phase of the Esync signal. The phase adjusting unit 82 continues accelerating the rotation motor 72 until the phase error between the Esync signal and the Async signal becomes "0". FIG. 3C shows the average phase error.

Additionally, a response time of phase adjusting control carried out by the phase adjusting unit 82 is defined as a period from a time at which a unit phase error occurs to a time at which the unit phase error is lessen to 5% thereof, and is called as the 95% adjusting period (tADJ). The period tADJ shown in FIG. 3C corresponds to the shortest suspension period taken for suspending the data recording process.

If it is assumed that an output value of a system approaches a unit input value "A" of the system as time passes, the output value can be expressed as the above-described equation (2) by approximating such a system by use of a first-order lag system. For instance, the output value becomes A×0.95 at the time t=3T. The time 3T is the 95% adjusting period (tADJ). Additionally, the phase error regarding the phase adjustment control can be obtained by the equation (3). According to the equation (3), a time taken for the phase error at the beginning of the phase adjustment control to be 5% thereof is 3T.

In the CD-R drive device 71, the 95% adjusting period (tADJ), the effective buffer size (BufSize) and the data write speed (Wspeed) are set to have a relation as shown in the above-described equation (4).

According to the equation (4), if the size of the data supplied from the computer 70 to the buffer memory 79 is "0", a period in which the data recording process continues is the "BufSize/Wspeed". In other words, a time at which data whose size is indicated by the effective buffer size "BufSize" is removed from the buffer memory 79 is the "BufSize/Wspeed". The phase adjusting unit 82 controls the rotational speed of the rotation motor 72 to complete 95% of the phase adjustment of the Async signal and the Esync signal in the period "BufSize/Wspeed", which is the shortest suspension period.

As described above, the CD-R drive device 71 does not accumulate a location error of the recording data on the CD-R, even in the worst case in which the data supply speed from the computer 70 to the buffer memory 79 is extremely slow, and the suspension and the resumption of the data recording process are repeated in the shortest period. Additionally, the phase adjusting unit 82 corrects 95% of the phase error, and, thus, the phase error is not corrected completely. However, the correction of 95% of the phase error satisfies an industrial standard.

In the above-described optical-disk recording system according the eleventh embodiment, the buffer memory 79 functions as a data storing unit that temporarily stores data therein. Additionally, the head 73, the encoder 77 and the laser driving unit 78 function as a data writing unit that extracts the data from the data storing unit in order, and writes the data in an optical disk. The timing management unit 76 and the buffer management unit 80 function as a writing control unit that starts a data recording (writing) process by use of the data writing unit if a size of the data stored in the data storing unit exceeds a first predetermined value (size), and suspends the data recording process using the data writing unit if the size of the data stored in the data storing unit becomes less than a second predetermined value (size).

The phase adjusting unit 82 functions as a phase adjusting unit that starts adjusting a phase error between a signal synchronous to data that is to be recorded in the optical disk, and a signal synchronous to a location on the optical disk when the data recording process starts, and finishes adjusting the phase error so that the phase error becomes substantially zero before suspension of the data writing process. Additionally, the phase adjusting unit 82 functions as an adjusting control unit that controls the phase adjusting unit to finish the phase adjustment so that the phase error becomes substantially zero in the shortest suspension period, which is obtained from an effective storage size of the data storing unit determined by the first and second predetermined sizes, and a data write speed to the optical disk. Further, the phase adjusting unit 82 functions as a scanning-speed adjusting unit that reduces the phase error by adjusting the scanning speed of the optical disk.

A description will now be given of an information recording process carried out by the CD-R drive device 71, with reference to FIG. 4. The information recording process includes the steps of storing data temporarily in the buffer memory 79, taking out the data from the buffer memory 79 sequentially, and writing the data in a CD-R.

At the step S1 shown in FIG. 4, the buffer management unit 80 decides whether the size of the data stored in the buffer memory 79 exceeds the first predetermined size "size1". If it is determined at the step S1 that the size of the data stored in the buffer memory 79 exceeds the first predetermined size "size1", the buffer management unit 80 proceeds to the step S2, and starts writing the data in the CD-R. Subsequently, at the step S3, the phase adjusting unit 82 starts adjusting the rotational speed of the CD-R by use of the rotation motor 72 in order to reduce the phase error between the Esync signal synchronous to the data to be written in the CD-R and the Async signal synchronous to a location on the CD-R. The phase adjusting unit 82 finishes adjusting the phase error so that the phase error becomes substantially zero in the shortest suspension period before the suspension of the data recording process.

Subsequently, at the step S4, the buffer management unit 80 decides whether the size of the data stored in the buffer memory 79 becomes less than the second predetermined size "size2". If it is determined at the step S4 that the size of the data stored in the buffer memory 79 becomes less than the second predetermined size "size2", the buffer management unit 80 suspends the data recording process.

According to the eleventh embodiment of the present invention as described above, the CD-R drive device 71 does not accumulate a location error of recording data on the CD-R, even in a case in which the data supply speed from the computer 70 is extremely slow, and suspension and resumption of a data recording process are repeated in the shortest period. Therefore, the optical-disk recording system according to the eleventh embodiment achieves a stable data recording process without a recording error. Additionally, the CD-R drive device 71 can carry out the data recording process to the CD-R at a constant speed easily and steadily. Therefore, the CD-R drive device 71 only needs to stabilize a physical characteristic at the time of recording the data to the CD-R, and can have a simple structure.

By always satisfying the equation (4) "tADJ<BufSize/Wspeed" in the above-described optical-disk recording system according to the eleventh embodiment, the CD-R drive device 71 possibly carries out a unstable control of the data recording process by picking up an ATIP signal detection noise or a resonance from the rotation motor 72, since the response time during a regular data recording process is excessively fast. Accordingly, the response time is preferably set slower after a certain period passes since the beginning of the data recording process, or after the phase adjustment by the phase adjusting unit 82 ends.

A description will now be given of an optical-disk recording system according to a twelfth embodiment of the present invention.

The structure of the optical-disk recording system according to the twelfth embodiment is the same as the structure of the optical-disk recording system according to the eleventh embodiment. However, the optical-disk recording system according to the twelfth embodiment has a function of the phase adjusting unit 82 different from that of the optical-disk recording system according to the eleventh embodiment.

The phase adjusting unit 82 of the optical-disk recording system according to the twelfth embodiment includes the phase comparator 20, the amplifier 21, the driver 22 and the gain switching unit 23, as shown in FIG. 5. The phase adjusting unit 82 detects the phase error between the Esync signal and the Async signal by use of the phase comparator 20. The amplifier 21 amplifies the phase error supplied from the phase comparator 20. Subsequently, the phase adjusting unit 82 drives the rotation motor 72 by use of an output of the amplifier 21 through the driver 22.

The gain switching unit 23 switches the gain of the amplifier 21, thereby increasing or decreasing sensitivity of the phase adjustment. The increase in the gain corresponds to the shortening of the response time of the phase adjustment control. In other words, the phase adjusting unit 82 functions as an adjustment-sensitivity control unit that lowers the sensitivity of the phase adjustment after the above-described phase adjustment of the Async signal and the Esync signal.

A description will now be given of a phase adjusting process carried out by the phase adjusting unit 82 according to the twelfth embodiment, with reference to FIG. 6. At the step S11 shown in FIG. 6, the gain switching unit 23 switches the gain of the amplifier 21 to a high gain that satisfies the condition "tADJ<BufSize/Wspeed" before starting the data recording process. Subsequently, at the step S12, the gain switching unit 23 decides whether the data recording process starts. If it is determined at the step S12 that the data recording process starts, the gain switching unit 23 proceeds to the step S13. The gain switching unit 23 decides whether a predetermined period, that is, the shortest suspension period, has passed, at the step S13. In detail, the gain switching unit 23 keeps the gain of the amplifier 21 high until the predetermined period passes. If it is determined at the step S13 that predetermined period has passed, the gain switching unit proceeds to the step S14, and switches the gain of the amplifier 21 from high to low, thereby lowering the sensitivity of the phase adjustment. The gain switching unit 23, then, keeps the gain of the amplifier 21 low until it is determined at the step S15 that the data recording process ends.

The optical-disk recording system according to the twelfth embodiment lowers the sensitivity of the phase adjustment so that the above-described 95% adjusting period becomes larger than the tADJ, after data is written continuously in the CD-R since the beginning of the data recording process, and the phase adjustment is finished. Accordingly, for writing long and continuous data in the CD-R, the response time is set slow. Thus, the optical-disk recording system can carry out the stable data recording process, since the control of the optical-disk recording system is not affected by the ATIP signal detection noise or the resonance of the rotation motor 72, which are picked up by the optical-disk recording system when the response time is fast.

Figure 18:
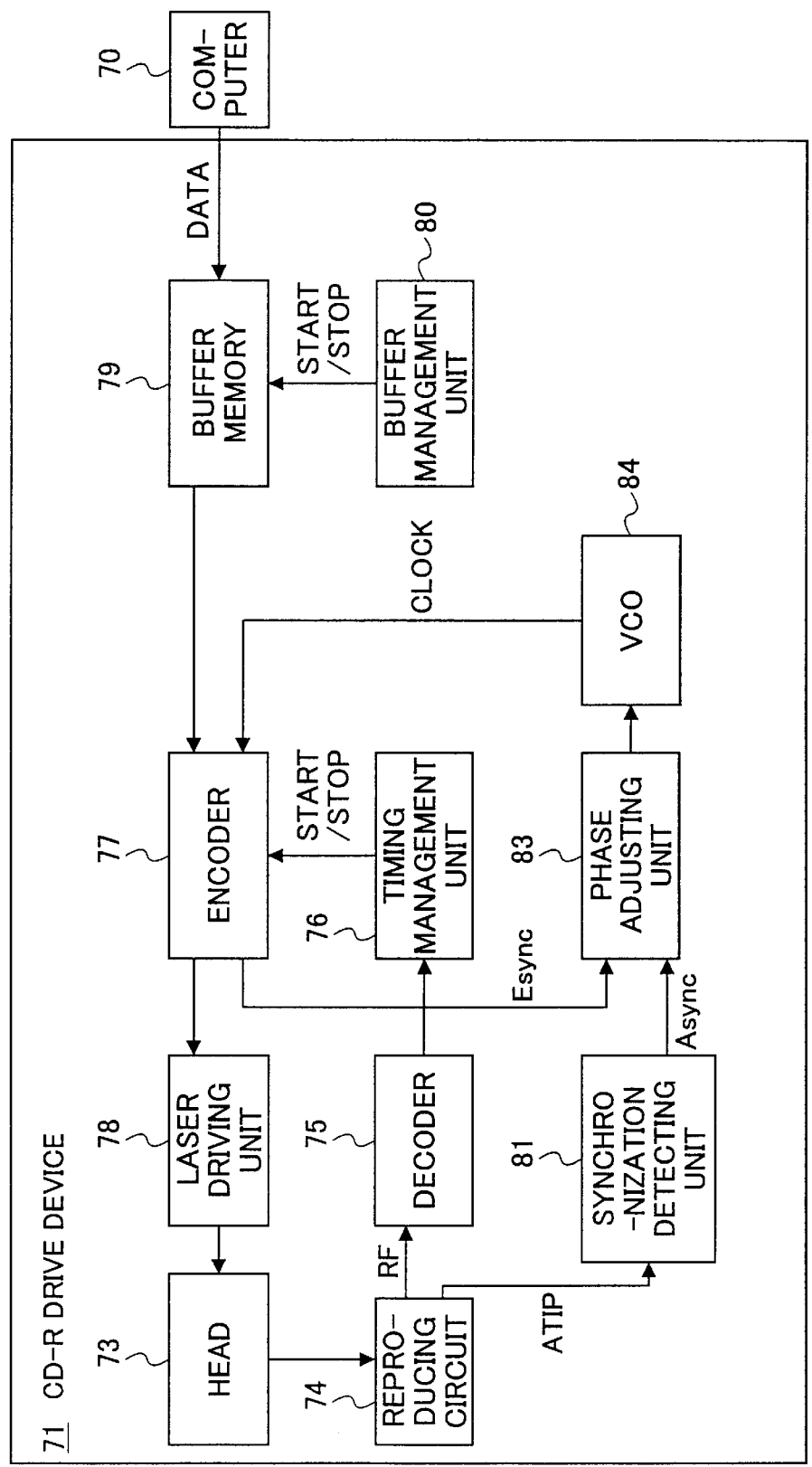
FIG. 18 is a block diagram showing a structure of an optical-disk recording system according to a thirteenth embodiment of the present invention.

A description will now be given of an optical-disk recording system according to a thirteenth embodiment of the present invention. FIG. 18 is a block diagram showing a structure of the optical-disk recording system according to the thirteenth embodiment. The optical-disk recording system shown in FIG. 18 includes the computer 70 and the CD-R drive device 71.

The computer 70 outputs data to be recorded in a CD-R. In detail, the computer 70 has the control unit composed of a micro computer including a CPU, a ROM, a RAM and the like, and carries out processes such as the data transmission to the CD-R drive device 71. On the other hand, the CD-R drive device 71 writes the data outputted by the computer 70 in the CD-R, and includes the head 73, the reproducing circuit 74, the decoder 75, the timing management unit 76, the encoder 77, the head driving unit 78, the buffer memory 79, the buffer management unit 80, the synchronization detecting unit 81, a phase adjusting unit 83 and a VCO 84. A unit having the same unit number as a unit shown in FIG. 17 corresponds to the unit shown in FIG. 17, and, thus, the description is omitted.

Filtering is preferably performed to avoid an error caused by a noise and the like, since the VCO 84 responds faster than the rotation motor 72. Thus, the optical-disk recording system according to the thirteenth embodiment controls a clock frequency of the encoder 77 by use of the phase adjusting unit 83 and the newly provided VCO 84, whereas the optical-disk recording system according to the previous embodiments controls the rotation motor 72 by use of the phase adjusting unit 82.

The phase adjusting unit 83 initially detects the phase error between the synchronous Esync signal outputted from the encoder 77 and the Async signal outputted from the synchronization detecting unit 81, which is the signal synchronous to the absolute location on the CD-R. The phase adjusting unit 83, then, changes frequency of an output clock of the VCO 84 to eliminate the phase error. Subsequently, the encoder 77 creates the recording data based on the output clock of the VCO 84. For instance, if the Esync signal is behind the Async signal as shown in FIGS. 9A and 9B, the frequency of the Esync signal becomes high by setting the frequency of the output clock of the VCO 84 to a high frequency. The phase of the Esync signal gradually becomes closer to the phase of the Async signal. The phase error between the Async signal and the Esync signal eventually becomes small enough so that the phases of the Async signal and the Esync signal correspond to each other.

As shown in FIG. 8, the above-described phase adjusting unit 83 includes the phase comparator 20 and the gain switching unit 23 shown in FIG. 5. Additionally, the phase adjusting unit 83 includes the amplifying/smoothing unit 24, which has a smoothing function in addition to an amplifying function.

The 95% adjusting period (tADJ) is defined as the response time of the phase adjustment also in the thirteenth embodiment. Additionally, the phase adjusting unit 83 sets the amplifying/smoothing unit 24 in the same manner as the phase adjusting unit 22 shown in FIG. 17 so that the phase adjusting unit 83 satisfies the condition "tADJ<BufSize/Wspeed". In other words, the phase adjusting unit 83 and the VCO 84 function as a clock-frequency adjusting unit that reduces the phase error by adjusting the frequency of the clock used for writing data in the CD-R. In addition, the gain switching unit 23 preferably switches gain of the amplifying/smoothing unit 24, thereby increasing or decreasing the sensitivity of the phase adjustment. The increasing gain corresponds to the shortening of the response time.

The phase adjusting unit 83 included in the optical-disk recording system according to the thirteenth embodiment carries out the phase adjusting process shown in FIG. 6. At the step S11 shown in FIG. 6, the gain switching unit 23 switches the gain of the amplifying/smoothing unit 24 to the high gain that satisfies the condition "tADJ<BufSize/Wspeed" before starting the data recording process. Subsequently, at the step S12, the gain switching unit 23 decides whether the data recording process starts. If it is determined at the step S12 that the data recording process starts, the gain switching unit 23 proceeds to the step S13. The gain switching unit 23 decides whether the predetermined period, that is, the shortest suspension period has passed, at the step S13. In detail, the gain switching unit 23 keeps the gain of the amplifier 21 high until the predetermined period passes. If it is determined at the step S13 that predetermined period has passed, the gain switching unit proceeds to the step S14, and switches the gain of the amplifier 21 from high to low, thereby lowering the sensitivity of the phase adjustment. The gain switching unit 23, then, keeps the gain of the amplifier 21 low until it is determined at the step S15 that the data recording process ends.

According to the thirteenth embodiment, the optical-disk recording system adjusts the frequency of the clock that is supplied to the encoder 77 and is used for recording the data so that the phase error decreases. Thus, the optical-disk recording system can easily and stably carry out the data recording process at a constant angular speed. Additionally, the CD-R drive device 71 does not need to control the rotational speed of the rotation motor 72 since the angular speed is constant. Thus, the optical-disk recording system can reduce its cost, and can speed up a data-write access to the CD-R.

The description has been given of the CD-R drive device reading data from or writing data to the CD-R, in the embodiments of the optical-disk recording device, the optical-disk recording method, and the optical-disk recording system. Alternatively, the present invention can be adapted to a CD-RW drive device that reads data from or writes data to a rewritable optical disk such as a CD-RW. In such a case, a structure of the CD-RW drive device has a function generally included in a CD-RW drive device in addition to each unit included in the above-described CD-R drive device. A description about the CD-RW drive device is omitted, since units and processes related to the present invention are same as the above-described embodiments.

In conclusion, data can be written in a recording medium at an accurate location without accumulating phase errors, even if suspension and resumption of a data recording process are repeated by a buffer under-run error preventing function, according to the information recording device, the information recording method, the recording medium storing the information recording program, the information recording system, the optical-disk recording device, the optical-disk recording method and the optical-disk recording system.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-153117, filed on May 24, 2000, the entire contents of which are hereby incorporated by reference.

What is claimed is:

1. An information recording device that writes data in a recording medium, comprising:

a data storing unit storing the data temporarily;

a data writing unit that takes the data out from said data storing unit sequentially, and writes the data in the recording medium;

a writing control unit that controls said data writing unit to start writing the data in the recording medium if a size of the data stored in said data storing unit exceeds a first predetermined size, and to suspend writing the data in the recording medium if the size of the data stored in the data storing unit becomes less than a second predetermined size; and a phase adjusting unit that starts adjusting a phase error between a signal synchronous to the data and a signal synchronous to a location on the recording medium when said data writing unit starts writing the data in the recording medium, and finishes adjusting the phase error so that the phase error becomes substantially zero before said writing control unit suspends said data writing unit from writing the data in the recording medium.

2. The information recording device as claimed in claim 1, further comprising an adjusting control unit that controls said phase adjusting unit to finish adjusting the phase error so that the phase error becomes substantially zero in a shortest suspension period, which is obtained from an effective storage size of said data storing unit determined by the first and second predetermined sizes, and a data writing speed to the recording medium.

3. The information recording device as claimed in claim 1, further comprising a scanning-speed adjusting unit that reduces the phase error by adjusting a scanning speed of the recording medium.

4. The information recording device as claimed in claim 1, further comprising a clock-frequency adjusting unit that reduces the phase error by adjusting a frequency of a clock used for writing the data in the recording medium.

5. The information recording device as claimed in claim 1, further comprising an adjustment-sensitivity control unit that lowers a sensitivity of phase adjustment performed by said phase adjusting unit after said phase adjusting unit finishes adjusting the phase error so that the phase error becomes substantially zero.

6. The information recording device as claimed in claim 1, wherein said recording medium is an optical disk, and said information recording device writes the data in the optical disk by applying light onto the optical disk.

7. A method of recording data in a recording medium, comprising the steps of:

storing the data temporarily as a stored data;

taking out the stored data sequentially;

starting writing the stored data in the recording medium when a size of the stored data exceeds a first predetermined size;

suspending writing the stored data in the recording medium when the size of the stored data becomes less than a second predetermined size;

starting adjusting a phase error between a signal synchronous to the stored data and a signal synchronous to a location on the recording medium when starting writing the stored data in the recording medium; and finishing adjusting the phase error so that the phase error becomes substantially zero before suspending writing the stored data in the recording medium.

8. The method as claimed in claim 7, further comprising the step of finishing adjusting the phase error so that the phase error becomes substantially zero in a shortest suspension period, which is obtained from an effective storage size determined by the first and second predetermined sizes, and a data writing speed to the recording medium.

9. The method as claimed in claim 7, further comprising the step of reducing the phase error by adjusting a scanning speed of the recording medium.

10. The method as claimed in claim 7, further comprising the step of reducing the phase error by adjusting a frequency of a clock used for writing the data in the recording medium.

11. The method as claimed in claim 7, further comprising the step of lowering a sensitivity of adjusting the phase error after finishing adjusting the phase error so that the phase error becomes substantially zero.

12. The method as claimed in claim 7, further comprising the step of writing the stored data in an optical disk by applying light onto the optical disk, wherein said optical disk is the recording medium.

13. A recording medium readable by a computer, tangibly embodying a program of instructions executable by the computer to write data in a recording medium, wherein said program includes the steps of:

storing the data temporarily as a stored data;

taking out the stored data sequentially;

starting writing the stored data in the recording medium when a size of the stored data exceeds a first predetermined size;

suspending writing the stored data in the recording medium when the size of the stored data becomes less than a second predetermined size;

starting adjusting a phase error between a signal synchronous to the stored data and a signal synchronous to a location on the recording medium when starting writing the stored data in the recording medium; and finishing adjusting the phase error so that the phase error becomes substantially zero before suspending writing the stored data in the recording medium.

14. The recording medium as claimed in claim 13, wherein said program further includes the step of finishing adjusting the phase error so that the phase error becomes substantially zero in a shortest suspension period, which is obtained from an effective storage size determined by the first and second predetermined sizes, and a data writing speed to the recording medium.

15. The recording medium as claimed in claim 13, wherein said program further includes the step of reducing the phase error by adjusting a scanning speed of the recording medium.

16. The recording medium as claimed in claim 13, wherein said program further includes the step of reducing the phase error by adjusting a frequency of a clock used for writing the data in the recording medium.

17. The recording medium as claimed in claim 13, wherein said program further includes the step of lowering a sensitivity of adjusting the phase error after finishing adjusting the phase error so that the phase error becomes substantially zero.

18. The recording medium as claimed in claim 13, wherein said recording medium is an optical disk, and said program further includes the step of writing the stored data in the optical disk by applying light onto the optical disk.

19. An information recording system, comprising:

an upper-level device outputting data to be written in a recording medium; and an information recording device writing the data outputted from said upper-level device in the recording medium, wherein said information recording device includes a data storing unit storing the data temporarily; a data writing unit that takes the data out from said data storing unit sequentially, and writes the data in the recording medium; a writing control unit that controls said data writing unit to start writing the data in the recording medium if a size of the data stored in said data storing unit exceeds a first predetermined size, and to suspend writing the data in the recording medium if the size of the data stored in the data storing unit becomes less than a second predetermined size; and a phase adjusting unit that starts adjusting a phase error between a signal synchronous to the data and a signal synchronous to a location on the recording medium when said data writing unit starts writing the data in the recording medium, and finishes adjusting the phase error so that the phase error becomes substantially zero before said writing control unit suspends said data writing unit from writing the data in the recording medium.

20. The information recording system as claimed in claim 19, wherein said information recording device further includes an adjusting control unit that controls said phase adjusting unit to finish adjusting the phase error so that the phase error becomes substantially zero in a shortest suspension period, which is obtained from an effective storage size of said data storing unit determined by the first and second predetermined sizes, and a data writing speed to the recording medium.

21. The information recording system as claimed in claim 19, wherein said information recording device further includes a scanning-speed adjusting unit that reduces the phase error by adjusting a scanning speed of the recording medium.

22. The information recording system as claimed in claim 19, wherein said information recording device further includes a clock-frequency adjusting unit that reduces the phase error by adjusting a frequency of a clock used for writing the data in the recording medium.

23. The information recording system as claimed in claim 19, wherein said information recording device further includes an adjustment-sensitivity control unit that lowers a sensitivity of phase adjustment performed by said phase adjusting unit after said phase adjusting unit finishes adjusting the phase error so that the phase error becomes substantially zero.

24. The information recording system as claimed in claim 19, wherein said recording medium is an optical disk, and said information recording device writes the data in the optical disk by applying light onto the optical disk.

* * * * *